(12) United States Patent
Hikichi

(10) Patent No.: US 12,504,892 B2
(45) Date of Patent: Dec. 23, 2025

(54) MEMORY SYSTEM WITH ENHANCED SECURITY ACCESS TO PARITAL STORAGE AREAS

(71) Applicant: Kioxia Corporation, Tokyo (JP)

(72) Inventor: Mari Hikichi, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 281 days.

(21) Appl. No.: 17/402,107

(22) Filed: Aug. 13, 2021

(65) Prior Publication Data

US 2022/0261162 A1 Aug. 18, 2022

(30) Foreign Application Priority Data

Feb. 15, 2021 (JP) ................... 2021-021773

(51) Int. Cl.
*G06F 3/06* (2006.01)
*G06F 1/14* (2006.01)
*G06F 21/60* (2013.01)
*H04L 9/14* (2006.01)

(52) U.S. Cl.
CPC .............. *G06F 3/0622* (2013.01); *G06F 1/14* (2013.01); *G06F 3/0637* (2013.01); *G06F 3/0679* (2013.01); *G06F 21/602* (2013.01); *H04L 9/14* (2013.01)

(58) Field of Classification Search
CPC ........ G06F 3/0622; G06F 1/14; G06F 3/0637; G06F 3/0679; G06F 21/602; G06F 12/0882; G06F 3/0605; G06F 3/0604; G06F 3/062; G06F 12/0223; G06F 21/101; G06F 21/1015; G06F 21/10; G06F 21/00; G06F 21/60; G06F 21/62; G06F 21/6218; G06F 21/6272; H04L 9/14; H04L 63/10; H04L 63/102; H04L 63/108
USPC ........................................ 713/190
See application file for complete search history.

(56) References Cited

U.S. PATENT DOCUMENTS

| | | | |
|---|---|---|---|
| 9,083,581 B1 * | 7/2015 | Addepalli | B60W 50/10 |
| 9,342,703 B2 * | 5/2016 | Simoncelli | G06F 21/604 |
| 10,162,977 B2 * | 12/2018 | Toillon | G06F 21/62 |
| 11,810,079 B2 * | 11/2023 | Haldenby | G06Q 20/405 |
| 2003/0077074 A1 | 4/2003 | Okamoto et al. | |
| 2005/0038757 A1 | 2/2005 | Wada | |
| 2005/0210187 A1 | 9/2005 | Yamamoto | |
| 2006/0190426 A1 * | 8/2006 | Kanazawa | G11B 20/00507 |

(Continued)

FOREIGN PATENT DOCUMENTS

| | | | | |
|---|---|---|---|---|
| CA | 3126072 A1 * | 7/2020 | | C12Q 1/6886 |
| CA | 2930281 C * | 5/2021 | | G06F 21/604 |

(Continued)

*Primary Examiner* — Tae K Kim
(74) *Attorney, Agent, or Firm* — Maier & Maier, PLLC

(57) ABSTRACT

According to one embodiment, a memory system includes a nonvolatile memory and a controller. The controller enables a first access authority to a first storage area which is at least a partial storage area of the nonvolatile memory and sets a first time limit at which the first access authority becomes disabled. The first access authority is assigned to first user identification information. The controller disables the first access authority in a case where current time exceeds the first time limit.

14 Claims, 13 Drawing Sheets

FIG. 8

(56) References Cited

U.S. PATENT DOCUMENTS

| | | | | |
|---|---|---|---|---|
| 2006/0242066 | A1* | 10/2006 | Jogand-Coulomb | G06F 21/78 705/50 |
| 2007/0169172 | A1* | 7/2007 | Backes | G06F 12/1466 711/E12.1 |
| 2010/0100948 | A1* | 4/2010 | Delia | H04L 63/0846 726/6 |
| 2010/0161928 | A1* | 6/2010 | Sela | G06F 12/0246 711/163 |
| 2010/0332834 | A1* | 12/2010 | Fu | H04L 9/08 713/170 |
| 2012/0005435 | A1* | 1/2012 | Emaru | G06F 3/061 711/E12.001 |
| 2012/0072735 | A1* | 3/2012 | Fukawa | G06F 21/62 713/189 |
| 2012/0124183 | A1* | 5/2012 | Long | G06F 3/0659 709/219 |
| 2012/0229838 | A1* | 9/2012 | Mogaki | G06F 21/608 358/1.14 |
| 2013/0167205 | A1* | 6/2013 | Michener | H04L 63/083 726/4 |
| 2014/0304836 | A1* | 10/2014 | Velamoor | G06F 21/6209 726/28 |
| 2015/0163206 | A1 | 6/2015 | McCarthy et al. | |
| 2016/0164878 | A1* | 6/2016 | Nakano | G06F 21/10 726/4 |
| 2016/0218875 | A1* | 7/2016 | Le Saint | H04L 9/0822 |
| 2016/0246980 | A1* | 8/2016 | Toillon | G06F 21/604 |
| 2017/0168851 | A1* | 6/2017 | Lin | G06F 9/4406 |
| 2017/0323114 | A1* | 11/2017 | Egorov | H04L 63/0435 |
| 2018/0129611 | A1 | 5/2018 | Parker et al. | |
| 2019/0141041 | A1* | 5/2019 | Bhabbur | H04L 9/3228 |
| 2020/0293206 | A1* | 9/2020 | Isozaki | H04L 9/088 |
| 2021/0232499 | A1* | 7/2021 | Yong | G06F 12/0246 |
| 2021/0289576 | A1* | 9/2021 | Cheaz | A61B 5/747 |
| 2021/0303674 | A1 | 9/2021 | Wood | |
| 2021/0352064 | A1* | 11/2021 | Tsarfati | H04L 63/1416 |
| 2022/0014528 | A1* | 1/2022 | Gambhir | H04L 63/104 |
| 2022/0239480 | A1* | 7/2022 | Hetzler | H04L 9/0891 |
| 2023/0281294 | A1* | 9/2023 | Oswal | H04L 63/102 726/6 |

FOREIGN PATENT DOCUMENTS

| | | | | |
|---|---|---|---|---|
| CN | 101004717 | A | 7/2007 | |
| CN | 102750113 | A | 10/2012 | |
| CN | 6690733 | B2 * | 9/2024 | G06F 30/20 |
| DE | 112011103666 | B4 * | 5/2021 | G06F 11/1482 |
| JP | 2002-251819 | A | 9/2002 | |
| JP | 2005-267701 | A | 9/2005 | |
| TW | 200813746 | A | 3/2008 | |
| TW | 201710902 | A | 3/2017 | |
| TW | 202036342 | A | 10/2020 | |
| WO | WO-2006069274 | A2 * | 6/2006 | G06F 21/6218 |
| WO | WO-2021112918 | A1 * | 6/2021 | C12Q 1/6886 |

\* cited by examiner

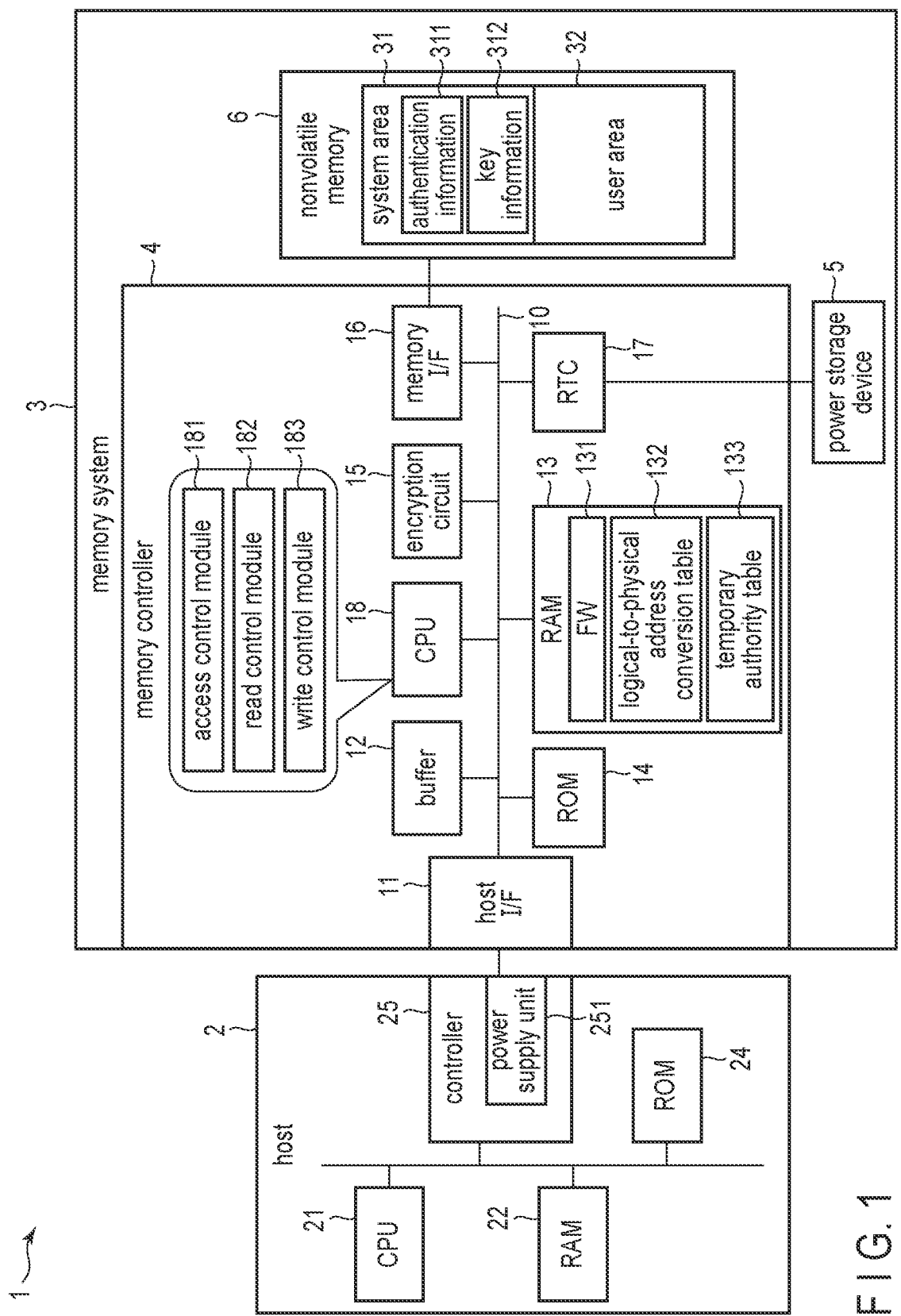
F I G. 1

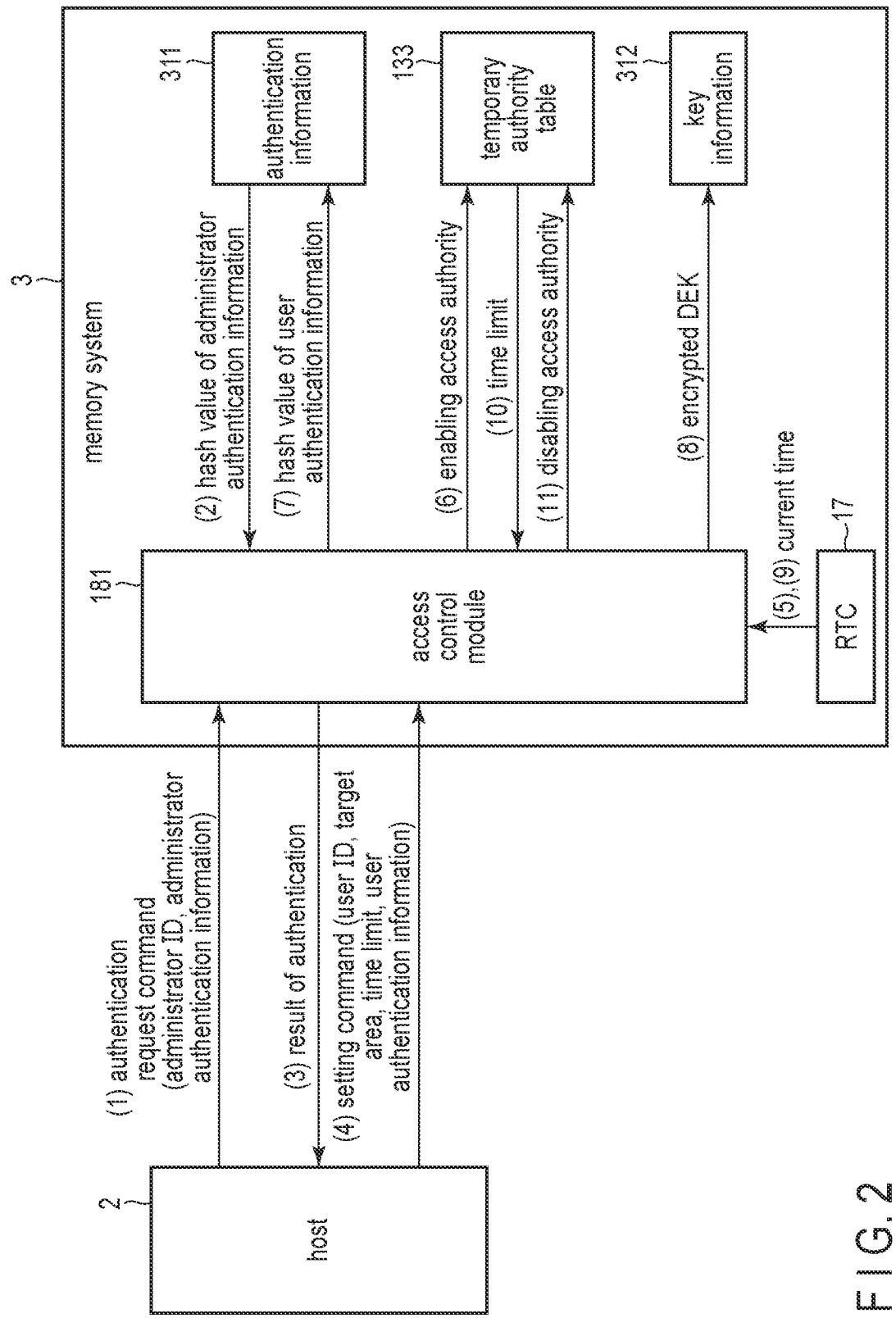
F I G. 2

| user ID | temporary authority enabled | start time | time limit | .... |
|---|---|---|---|---|
| TmpUser1 | true | 2020/10/1 | 2020/10/31 | .... |
| TmpUser2 | false | null | null | .... |
| TmpUser3 | false | null | null | .... |
| ⋮ | ⋮ | ⋮ | ⋮ | ⋮ |

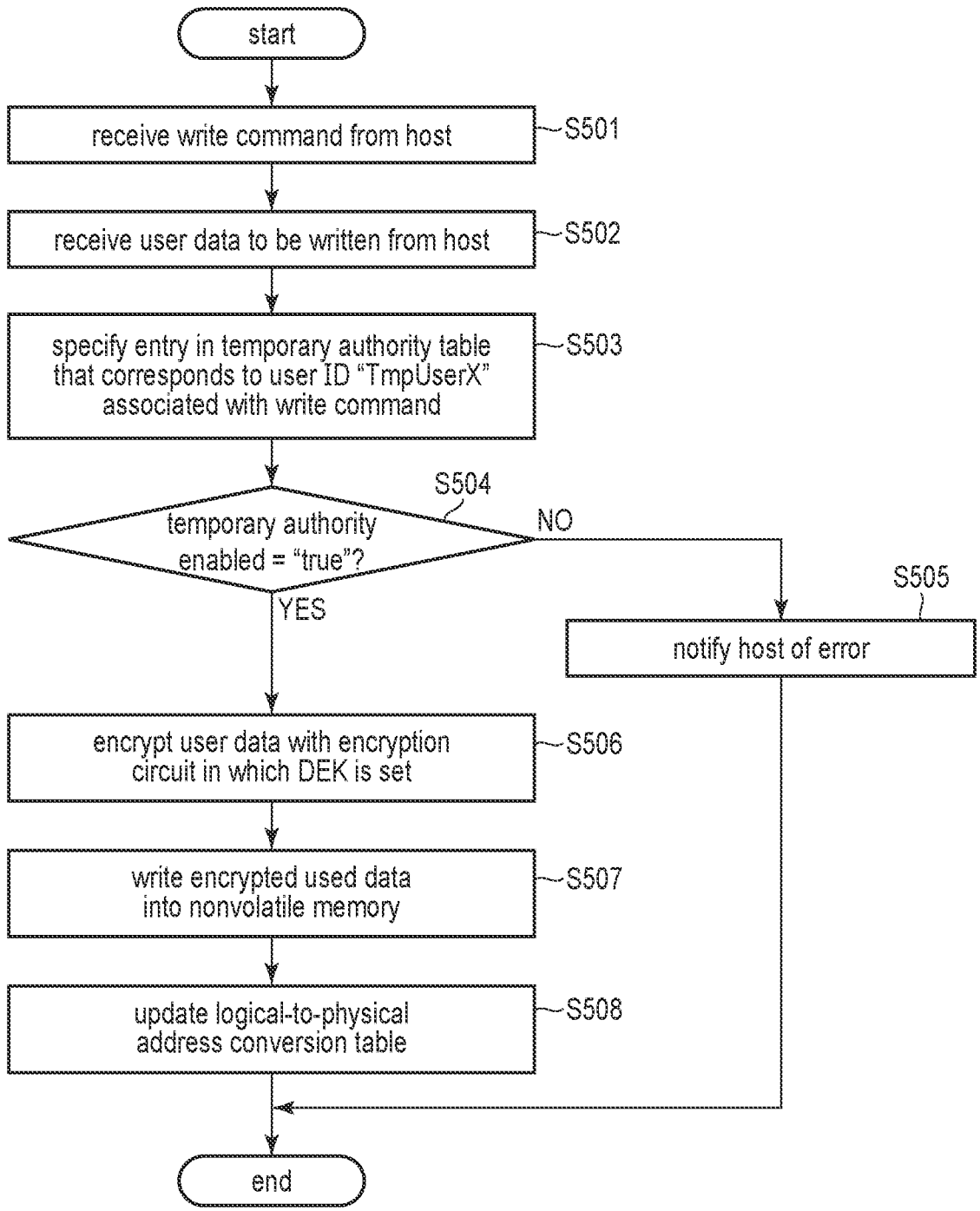
F I G. 13

MEMORY SYSTEM WITH ENHANCED SECURITY ACCESS TO PARITAL STORAGE AREAS

CROSS-REFERENCE TO RELATED APPLICATIONS

This application is based upon and claims the benefit of priority from Japanese Patent Application No. 2021-021773, filed Feb. 15, 2021, the entire contents of which are incorporated herein by reference.

FIELD

Embodiments described herein relate generally to a technique for controlling a memory system that includes a nonvolatile memory.

BACKGROUND

In recent years, memory systems including a nonvolatile memory are widely used. As one of such memory systems, a solid state drive (SSD) including a NAND flash memory is known. The SSD is used as a main storage for various computing devices.

In order to prevent data leakage, a memory system may have a self-encrypting function of automatically encrypting data at the time of writing. The memory system having the self-encrypting function is also referred to as a self-encrypting drive (SED).

One of the security standards to which the SED should conform is Trusted Computing Group (TCG) standard. TCG standard defines, for example, data encryption and access control for each partial area in storage.

BRIEF DESCRIPTION OF THE DRAWINGS

FIG. 1 is a block diagram illustrating a configuration example of an information processing system including a memory system according to a first embodiment.

FIG. 2 is a diagram illustrating an example of an operation for enabling and disabling an access authority assigned to user identification information (user ID) in the memory system of the first embodiment.

FIG. 13 is a flowchart illustrating an example of the procedure of a write command process executed in the memory system of the first embodiment.

DETAILED DESCRIPTION

Figures 3, 4:
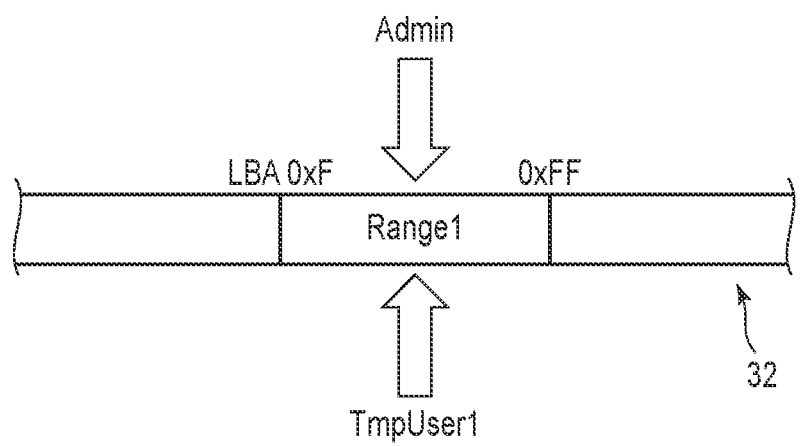
FIG. 3 is a view illustrating an example of a storage area whose access authority is controlled in the memory system of the first embodiment.
FIG. 4 is a view illustrating a configuration example of a temporary authority table used in the memory system of the first embodiment.

Various embodiments will be described hereinafter with reference to the accompanying drawings.

In general, according to one embodiment, a memory system includes a nonvolatile memory and a controller. The controller enables a first access authority to a first storage area which is at least a partial storage area of the nonvolatile memory and sets a first time limit at which the first access authority becomes disabled. The first access authority is assigned to first user identification information. The controller disables the first access authority in a case where current time exceeds the first time limit.

First Embodiment

First, a configuration of an information processing system 1 according to a first embodiment will be described with reference to FIG. 1. The information processing system 1 includes a host device 2 (hereinafter, referred to as host 2) and a memory system 3.

The host 2 is an information processing apparatus. The host 2 may be a storage server that stores a large amount of various data in the memory system 3, or may be a personal computer.

The memory system 3 is a semiconductor storage device configured to write data into a nonvolatile memory 6, such as a NAND flash memory, and read data from the nonvolatile memory 6, and is also referred to as a storage device. The memory system 3 may be realized as, for example, a solid state drive (SSD) including a NAND flash memory. Although a case where the memory system 3 is realized as the SSD will be described hereinafter, the memory system 3 may be realized as a hard disk drive (HDD).

The memory system 3 has a self-encrypting function of automatically encrypt. Ng data at the time of writing in order to prevent data leakage. That is, the memory system 3 is a self-encrypting drive (SED) having the self-encrypting function. The memory system 3 conforms to, for example, Trusted Computing Group (TCG) standard, and has the self-encrypting function defined by TCG standard. TCG standard defines, for example, data encryption and access control for each partial area in storage.

The memory system 3 may be used as a storage of the host 2. The memory system 3 may be built in the host 2 or may be connected to the host 2 via a cable or a network.

An interface for interconnecting the host. 2 and the memory system 3 conforms to standards such as SCSI, serial attached SCSI (SAS), ATA, serial ATA (SATA), PC. Express (PCIe) (registered trademark), Ethernet (registered trademark), Fibre channel, or NVM Express (NVMe) (registered trademark).

The host 2 includes, for example, a CPU 21, a random access memory (RAM) 22, a read-only memory (ROM) 24, and a controller 25. The RAM 22 is, for example, a static random access memory (SRAM). The ROM 24 is, for example, a NOR flash memory.

The CPU 21 is a processor that controls operations of various components in the host 2. The CPU 21 executes various programs loaded from the ROM 24 to the RAM 22, for example. These programs include a basic input/output system (BIOS), an operating system (OS), and various application programs. The BIOS is a program for hardware control.

The controller 25 functions as a circuit that controls communication with the memory system 3. Further, the controller 25 includes a power supply unit 251. The power supply unit 251 control power supplied to the memory system 3 using, for example, power supplied from an external power supply (not illustrated) to the host 2. Specifically, the power supply unit 251 supplies power to the memory system 3 while the host 2 is operating (that is, while the host 2 is in a power-on state). The power supply unit 251 does not supply power to the memory system 3 while the host 2 is not operating (that is, while the host 2 is in a power-off state).

The memory system 3 includes, for example, a memory controller 4, a power storage device 5, and the nonvolatile memory 6. The memory controller 4 may be realized by a circuit such as a system-on-a-chip (SoC).

The power storage device 5 functions as a power source in a case where the power supplied from the power supply unit 251 is shut off. The power storage device 5 may be realized as, for example, a button cell or an electric double-layer capacitor.

The nonvolatile memory 6 includes multiple blocks. Each of the blocks includes multiple pages. The blocks each function as a minimum data erase unit. A block may be referred to as an erase block or a physical block. Each of the pages includes memory cells connected to a single word line. The pages each function as a unit of a data write operation and a data read operation. Note that a word line may function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data write operation to write data in each page of the block.

The memory controller 4 functions as a controller configured to control the nonvolatile memory 6.

The memory controller 4 includes, for example, a host interface (host I/F) 11, a buffer 12, a RAM 13, a ROM 14, an encryption circuit 15, a memory I/F 16, a real-time clock (RTC) 17, and a CPU 13. The host 7/F 11, the buffer 12, the RAM 13, the ROM 14, the encryption circuit 15, the memory I/F 16, the RTC 17, and the CPU 18 may be connected via a bus 10.

The RAM 13 is, for example, an SRAM. The ROM 14 is, for example, a NOR flash memory. Note that a RAM (for example, a DRAM) may be provided outside the memory controller 4, instead of the RAM 13 built in the memory controller 4 or in addition to the PAM 13. In such a case, the memory controller 4 is provided with a control circuit configured to control access to the external RAM.

The memory controller 4 may function as a flash translation layer (FTL) configured to execute data management and block management of the nonvolatile memory 6. The data management executed by the FTL includes (1) management of mapping data indicative of relationship between each logical address and each physical address of the nonvolatile memory 6, and (2) process to hide a difference between read/write operations executed in units of page and erase operations executed in units of block. The block management includes management of defective blocks, wear leveling, and garbage collection (GC). Note that the logical address is an address used by the host 2 for addressing the memory system 3. The logical address is, for example, a logical block address (LBA). Hereinafter, a case where the LBA is used as the logical address will be mainly explained.

Management of mapping between each LBA and each physical address is executed by using a logical-to-physical address conversion table 132. The memory controller 4 manages mapping between each LBA and each physical address with a certain management size by using the logical-to-physical address conversion table 132. A physical address corresponding to an LBA indicates a physical memory location in the nonvolatile memory 6 to which data of the LBA is written. The logical-to-physical address conversion table 132 may be loaded to the RAM 13 from the nonvolatile memory 6 when the memory system 3 is powered on.

Data write into one page is executable only once in a single P/E cycle. Thus, the memory controller 4 writes updated data corresponding to an LBA not to an original physical memory location in which previous data corresponding to the LBA is stored but to a different physical memory location. Then, the memory controller 4 updates the logical-to-physical address conversion table 132 to associate the LBA with the different physical memory location and to invalidate the previous data. Data to which the logical-to-physical address conversion table 132 refers (that is, data associated with an LBA) will be referred to as valid data. Furthermore, data not associated with any LBA will be referred to as invalid data. The valid data is data to possibly be read by the host 2 later. The invalid data is data not to be read by the host 2 anymore.

The memory controller 4 manages at least one storage area obtained by logically dividing a storage area of the nonvolatile memory 6. The storage area of the nonvolatile memory 6 is allocated as, for example, a system area 31 and a user area 32.

The system area 31 stores, for example, authentication information 311 and key information 312.

The authentication information 311 is information for verifying the authenticity of an administrator or a user who uses the host 2. Hereinafter, identification information corresponding to an administrator authority is referred to as an administrator ID, and user identification information is referred to as a user ID. The authentication information 311 includes, for example, authentication information of an administrator ID and authentication information for each user ID.

The user ID is information for identifying a user who accesses the memory system 3 using the host 2. One user ID is used by, for example, one user. Alternatively, one user ID may be used by multiple users. For example, one user ID may be used by one user during a period and used by another user during another period.

As authentication information of an administrator ID and authentication information of a user ID, for example, a personal identification number (PIN) or a password is used. The authentication information 311 may also include a hash value of the PIN and a hash value of the password.

The key information 312 includes information on a data encryption key (DEK). The DEK is used for encrypting data to be written into the nonvolatile memory 6 and decrypting data read from the nonvolatile memory 6. The key information 312 may also include an encrypted DEK obtained by encrypting the DEK. The encrypted DEK is obtained, for example, by encrypting the DEK with a key encryption key (KEK) that is generated using authentication information of an administrator ID or authentication information of each user ID. The key information 312 may include the KEK or information used for generation of the KEK (for example, a random number). The KEK or the information used for generation of the KEK is associated with the corresponding authentication information.

The authentication information 311 and/or the key information 312 may be loaded from the nonvolatile memory 6 into the RAM 13 at the time of starting the memory system 3, for example.

The user area 32 is an area where access by a user is controlled using the authentication information 311.

The host I/F 11 functions as a circuit that receives various commands such as I/O commands, control commands, and TCG commands from the host 2. The I/O commands may include a write command and a read command. The control commands may include an unmap command (trim command) and a format command. The format command is a command for unmapping all the LBAs in the memory system 3 entirely. The TCG commands may include a command for requesting the memory system 3 to perform authentication, a setting change related to access to the nonvolatile memory 6, and the like. The host I/F 11 also functions as a circuit that transmits to the host 2 responses or data in accordance with received commands, control commands, and the like.

The buffer 12 is, for example, a DRAM. The buffer 12 is a storage area for temporarily storing data to be written into the nonvolatile memory 6 and data read from the nonvolatile memory 6. The storage area of the buffer 12 is allocated to, for example, areas used as a read buffer, a write buffer, and a garbage collection (GC) buffer.

A storage area of the RAM 13 is allocated to, for example, a storage area of a firmware (M) 131, a cache area of the logical-to-physical address conversion table 132, and a storage area of a temporary authority table 133. The storage area of the RAM 13 may be allocated to buffer areas used as a read buffer, a write buffer, and a GC buffer.

The FW 131 is programs for controlling an operation or the memory controller 4. The FW 131 is loaded from the nonvolatile memory 6 or the ROM 14 to the RAM 13, for example.

The logical-to-physical address conversion table 132 manages mapping between each LBA and each physical address of the nonvolatile memory 6.

The temporary authority table 133 manages an access authority to at least partial storage area of the nonvolatile memory 6 that is assigned to a user ID and is enabled or disabled, and a time limit at which the access authority is disabled.

The encryption circuit 15 performs encryption and decryption of user data. The encryption circuit 15 encrypts user data to be written into the nonvolatile memory 6 via the memory I/F 16. The encryption circuit 15 decrypts user data read from the nonvolatile memory 6 via the memory I/F 16. The encryption circuit 15 uses a DEK set by the CPU 18, for example, for encryption and decryption. The encryption circuit 15 may perform, for example, signature verification of the FW 131 and calculation of a hash value.

The memory I/F 16 electrically connects the memory controller 4 and the nonvolatile memory 6. The memory I/F 16 conforms to an interface standard such as a toggle DDR and an open NAND flash interface (ONFI).

The memory I/F 16 functions as a memory control circuit configured to control the nonvolatile memory 6. The memory I/F 16 may be connected to memory chips in the nonvolatile memory 6 via multiple channels. By operating the memory chips in parallel, it is possible to broaden an access bandwidth to the nonvolatile memory 6.

The RTC 37 is a clock that operates regardless of whether power is externally supplied to the memory system 3. The RTC 17 provides the current time in response to a request from each unit in the memory system 3 (for example, the CPU 18). While power is supplied from the power supply unit 251 of the host 2 to the memory system 3, the RTC 17 operates using the supplied power. Further, the RTC 17 operates using the power supplied from the power storage device 5 when power is not supplied from the power supply unit 251 to the memory system 3. That is, the power storage device 5 supplies power to the RTC 17 when the power supplied from the power supply unit 251 is shut off.

The CPU 18 is a processor configured to control the respective units in the memory controller 4. The CPU 18 performs various processes by executing the FW 131 that is loaded from the nonvolatile memory 6 in the RAM 13. The FW 131 is control programs that include instructions for causing the CPU 18 to perform the various processes. The CPU 18 may perform command processes to execute various commands from the host 2. The operation of the CPU 18 is controlled by the FW 131 executed by the CPU 18.

The functions of the respective units in the memory controller 4 may be realized by a dedicated hardware in the memory controller 4, realized by the CPU 18 executing the FW 131, or realized by a combination thereof.

Next, a method of enabling and disabling an access authority to at least partial storage area of the nonvolatile memory 6 assigned to a user will be described.

In the SED, for example, an access authority for a first user to access a first area of the user area 32 in the nonvolatile memory 6 is enabled in accordance with a first setting command that is issued with the administrator authority. In the SED, the access authority for the first user to access the first area is disabled in accordance with a second setting command that is issued with the administrator authority. As the first and second setting commands, Set command of TCG standard is used, for example.

In a method for enabling or disabling an access authority in accordance with a setting command that is issued with the administrator authority, there is a possibility that a user that needs to be disabled remains enabled due to, for example, a mistake in a command operation. If the user that needs to be disabled remains enabled, there is a risk of data leakage and tampering.

For example, it is considered a case where it is desired to enable an access authority to the memory system 3 assigned to a member who temporarily participates in a project only during a participation period. In this case, an administrator (that is, a user having the administrator authority) appropriately controls the access authority of the member by issuing a setting command for disabling the access authority at a timing when the participation period ends.

However, if the administrator issues a wrong command or forgets the issuance of a setting command, there is a possibility that a member whose access authority needs to be disabled continues to access the nonvolatile memory 6. As a result, there is a risk of data leakage and tampering.

Therefore, in the information processing system 1 of the embodiment, when an access authority of a user is enabled, a time limit at which the access authority becomes disabled is also set. Specifically, for example, a setting command for requesting enabling of an access authority and setting of a time limit at which the access authority becomes disabled is introduced. The memory system 3 automatically disables the access authority when the current time exceeds the set time limit. As described above, the current time is acquired from the RTC 17 operable with the power supplied from the power storage device 5 even when power is not supplied to the memory system 3.

As a result, the administrator does not need to perform an operation for issuing a command to disable the access authority at the timing when the access authority of the user needs to be disabled. Therefore, it is possible to prevent the access authority that needs to be disabled from remaining in the enabled state due to the mistake in the command operation. Therefore, it is possible to prevent an unintended user from accessing the nonvolatile memory 6.

The memory system 3 permits a user who has an enabled access authority and correct authentication information to access the nonvolatile memory 6. As a result, the risk of data leakage and tampering can be reduced, and security of access to the nonvolatile memory 6 can be enhanced.

The CPU 18 functions as, for example, an access control module 181, a read control module 182, and a write control module 183 in order to realize the above-described operations. The CPU 18 functions as these modules by, for example, executing the FW 131.

The access control module 181 controls access to at least partial storage area of the nonvolatile memory 6. The access control module 181 uses, for example, the temporary authority table 133 to control the access. The access control module 181 uses the temporary authority table 133 to manage an enabled or disabled access authority to at least partial storage area of the nonvolatile memory 6 set for a user ID, and a time limit at which the access authority becomes disabled. By using the temporary authority table 133, the access control module 181 enables an access authority (first access authority) to at least a partial area of the nonvolatile memory 6 assigned to a first user ID, and sets a first time limit at which the first access authority becomes disabled. Then, the access control module 181 disables the first access authority when the current time exceeds the set time limit.

The access control module 181 receives a command associated with a user ID from the host 2. The command includes, for example, the associated user ID or information capable of specifying the user ID. Alternatively, the access control module 181 may acquire a user ID associated with a command together with the command.

The access control module 181 determines whether an access authority assigned to the associated user ID is enabled or disabled by using the temporary authority table 133. Then, the access control module 181 determines whether to permit execution of the command according to the determination result. Specifically, when the access authority assigned to the user ID is enabled, the access control module 181 controls the respective units in the memory system 3 such that a process in accordance with the command is executed. Further, when the access authority assigned to the user ID is disabled, the access control module 161 controls the respective units in the memory system 3 so as to notify the host 2 of an error, for example.

A case where a command received from the host 2 is a command that requests authentication of an administrator or a user will be described. Hereinafter, the command that requests authentication of an administrator or a user is also referred to as an authentication request command. The authentication request command includes information for identifying an administrator (administrator ID) or information for identifying a user (user ID), and authentication information (for example, PIN).

When receiving an authentication request command of a user, the access control module 181 executes an authentication process in accordance with the authentication request command in a case where an access authority assigned to a user ID in the authentication request command is enabled. Ln a case where the access authority assigned to the user ID is disabled, the access control module 181 notifies the host 2 of an error, for example. The authentication process is a process for verifying the correctness of the authentication information included in the authentication request command.

Next, a case where a command received from the host 2 is an access command that requests access to the nonvolatile memory 6 will be described. The access command is, for example, a read command and a write command. The access command may be another command that requests access to the nonvolatile memory 6, such as an unmap command, a format command, and a verify command.

After authentication of a user has been successful, the access control module 181 receives an access command associated with a user ID of the user. Note that, in a case where the authentication of the user is not successful, the access control module 181 notifies the host 2 of an error for the access command associated with the user ID of the user.

The access control module 181 receives an access command associated with a user ID, and executes processes in accordance with the access command when an access authority assigned to the user ID is enabled. For example, in a case where the access command is a read command, the access control module 181 causes the read control module 182 to execute processes in accordance with the read command. For example, in a case where the access command is a write command, the access control module 181 causes the write control module 183 to execute processes in accordance with the write command.

Examples of specific operations of the access control module 181, the read control module 182, and the write control module 183 will be described with reference to FIGS. 2 to 6. Note that at least part of the operation of the access control module 181 may be performed by the encryption circuit 15.

FIG. 2 illustrates an example of an operation for enabling and disabling an access authority assigned to a user ID. The access authority assigned to the user ID is enabled after authentication of an administrator has been successful. Therefore, the host 2 and the memory system 3 first perform a process for authentication of the administrator.

Specifically, first, the host 2 transmits an authentication request command for the administrator to the memory system 3 ((1) in FIG. 2). The authentication request command for the administrator includes, for example, an administrator ID and authentication information.

The access control module 181 of the memory system 3 receives the authentication request command. The access control module 181 calculates a hash value of the authentication information included in the authentication request command. A hash function defined in advance is used to calculate the hash value. The access control module 181 acquires a hash value of authentication information of the administrator from the authentication information 311 ((2) in FIG. 2). When the calculated hash value matches the acquired hash value of the authentication information of the administrator, the access control module 181 determines that the authentication of the administrator is successful. Then, the access control module 181 notifies the host 2 of the successful authentication ((3) in FIG. 2).

When the calculated hash value is different from the acquired hash value of the authentication information of the administrator, the access control module 181 determines that the authentication of the administrator is not successful. In this case, the access control module 181 notifies the host 2 of the unsuccessful authentication ((3) in FIG. 2).

Hereinafter, an operation of controlling an access authority to at least partial storage area of the nonvolatile memory 6 assigned to a user ID will be described. The operation of controlling the access authority is performed in a case where the authentication of the administrator has been successful. The operation of controlling the access authority includes an operation of enabling the access authority and an operation of disabling the access authority. The storage area for which the access authority is to be controlled is also referred to as a target area.

FIG. 3 illustrates an example of the target area. The access control module 181 controls an access authority to at least one storage area that is obtained by logically dividing the storage area of the nonvolatile memory 6. More specifically, for example, the access control module 181 controls an access authority to at least one area that is obtained by logically dividing the user area 32 in the nonvolatile memory 6. Each area obtained by logically dividing the user area 32 is also referred to as a range. A range corresponds to an LBA range. The access control module 131 controls access authorities assigned to an administrator ID and a user ID, for example, for each range.

In the example illustrated in FIG. 3, a Range1 is set in the user area 32. The Range1 corresponds to an LBA range from 0xF to 0xFF. Further, access authorities to the Range1 assigned to an administrator ID "Admin" and a user ID "TapUser1" are enabled.

In this case, the access control module 181 performs control such that an administrator having correct authentication information is capable of accessing the Range1. The access control module 181 performs control such that a user who uses TmpUser1 and has correct authentication information is capable of accessing the Range1. Further, the access control module 181 performs control so as to prevent a user who uses a user ID other than TmpUser1 from accessing the Range1.

The access control module 181 uses the temporary authority table 133 to control the access authorities.

FIG. 4 illustrates a configuration example of the temporary authority table 133. The temporary authority table 133 may include entries that correspond to user IDs, respectively. Each of the entries includes, for example, a user ID field, a temporary authority enabled field, a start time field, and a time limit field.

In an entry corresponding to a user ID, the user ID field indicates the user ID.

The temporary authority enabled field indicates whether an access authority assigned to the corresponding user ID to at least partial storage area (for example, a range) of the nonvolatile memory 6 is enabled or disabled. When the access authority is enabled, for example, "true" is set in the temporary authority enabled field. When the access authority is disabled, for example, "false" is set in the temporary authority enabled field.

The start time field indicates time at which the access authority assigned to the corresponding user ID has been enabled. The time indicated in the start time field may be a date or a date and time.

The time limit field indicates a time limit at which the access authority assigned to the corresponding user ID becomes disabled. The time limit indicated in the time limit field is represented by, for example, a date or a date and time. Further, the time limit indicated in the time limit field may be a period starting from the time indicated in the start time field. The period is represented by a length of time in an arbitrary unit such as a year, a month, or a day. In a case where the current time has exceeded the time limit indicated in the time limit field, the access authority assigned to the corresponding user ID is disabled.

In the following description of the temporary authority table 133, a value indicated in the user ID field is also simply referred to as a user ID. The same applies to values indicated in the other fields.

In the example illustrated in FIG. 4, the temporary authority enabled corresponding to the user ID "TmpUser1" is "true". The start time corresponding to the user ID "TmpUser1" is "2020/10/1". The time limit corresponding to the user ID "TmpUser1" is "2020/10/31". Therefore, the entry including the user ID "TmpUser1" indicates that the access authority assigned to TmpUser1 is enabled from Oct. 1, 2020 to Oct. 31, 2020.

The temporary authority enabled corresponding to the user ID "TmpUser2" is "false". No value (null) is set as the start time and the time limit corresponding to the user ID "TmpUser2". Therefore, the entry including the user ID "TmpUser2" indicates that the access authority assigned to TmpUser2 is disabled.

Further, the temporary authority enabled corresponding to the user ID "TmpUser3" is "false". No value is set as the start time and the time limit corresponding to the user ID "TmpUser3". Therefore, the entry including the user ID "TmpUser3" indicates that the access authority assigned to TmpUser3 is disabled.

Note that each entry of the temporary authority table 133 may further include an access count field and a maximum access count field. The access count field indicates the number of times of access to the nonvolatile memory 6 by a corresponding user ID. The maximum access count field indicates the maximum number of times that access to the nonvolatile memory 6 is permitted for a corresponding user ID. In this case, the access control module 181 disables the access authority assigned to the corresponding user ID, for example, in a case of satisfying at least one of a condition that the current time has exceeded the time limit and a condition that the access count has reached the maximum access count.

Alternatively, each entry of the temporary authority table 133 may further include the fields of the access count and the maximum access count, instead of the fields of the start time and the time limit. In this case, when the access count has reached the maximum access count, the access control module 181 disables the access authority assigned to the corresponding user ID.

Note that each entry of the temporary authority table 133 may include various fields regarding conditions for disabling an access authority assigned to a corresponding user ID without being limited to the fields of the start time and the time limit and the fields of the access count and the maximum access count.

The description will continue returning to FIG. 2. When the host 2 is notified of successful authentication of the administrator, the host 2 transmits (issues) a setting command to the memory system 3 with the administrator authority ((4) in FIG. 2). This setting command is a command that requests enabling an access authority to at least partial storage area of the nonvolatile memory 6 assigned to a user ID, and setting of a time limit at which the access authority becomes disabled. The setting command includes the user ID, a target area, and the time limit. The target area is indicated by, for example, identification information of a range or an LBA range (for example, a starting LBA and a size). Further, the setting command may further include authentication information of the user ID. Note that, in a case where the setting command does not include the authentication information of the user ID, the host 2 transmits another command including the authentication information of the user ID to the memory system 3.

The access control module 181 receives the setting command. The access control module 181 acquires the current time from the RTC 17 ((5) in FIG. 2). Then, the access control module 181 updates the temporary authority table 133 to enable the access authority to the target area assigned to the user ID that is designated in the setting command ((6) in FIG. 2). More specifically, the access control module 181 specifies an entry in the temporary authority table 133 that includes the user ID designated in the setting command. Then, in the specified entry, the access control module 181 (1) sets "true" as the temporary authority enabled, (2) sets the current time acquired from the RTC 17 as the start time, and (3) sets the time limit designated in the setting command as the time limit. As a result, the access authority to the target area, which is assigned to the user ID, is enabled.

The access control module 181 calculates a hash value of user authentication information included in the setting command. The access control module 181 stores the calculated hash value of the user authentication information in the nonvolatile memory 6 as a part of the authentication information 311 ((7) in FIG. 2). The stored hash value of the user authentication information is used as a hash value of correct user authentication information corresponding to the user ID for later processes of authenticating a user. Note that, in a case where a hash value of user authentication information corresponding to the user ID is already stored in the nonvolatile memory 6, the access control module 181 replaces the stored hash value with the calculated hash value. This replacement corresponds to a change of the user authentication information corresponding to the user ID.

Further, the access control module 181 encrypts a DEK, which is used for accessing the target area, using the user authentication information included in the setting command, thereby acquiring the encrypted DEK. The access control module 181 stores the acquired encrypted DEK as a part of the key information 312 in the nonvolatile memory 6 ((8) in FIG. 2). The DEK used for accessing the target area is used for encrypting data to be written into the target area and decrypting encrypted data read from the target area.

Here, a method for encrypting the DEK using the user authentication information will be described. First, the access control module 181 generates a KEK using the user authentication information. Specifically, for example, the access control module 181 generates the KEK by using a key derivation function (KDF) with a parameter that is secret and a parameter that is not secret as input values. The secret parameter is, for example, user authentication information. The non-secret parameter is, for example, a random number.

Next, the access control module 181 encrypts the DEK, which is used for accessing the target area, using the generated KEK. Then, the access control module 181 stores the encrypted DEK as a part of the key information 312 in the nonvolatile memory 6. The stored encrypted DEK is used when a user using the user ID attempts to access the target area thereafter. When the user using the user ID inputs correct authentication information, the encrypted DEK is decrypted, and access to the target area using the DEK becomes possible. The access control module 181 stores a random number, which is used for generation of the KEK, as a part of the key information 312 in the nonvolatile memory 6. In this case, after the user using the user ID inputs the correct authentication information, the KEK is generated using the stored random number and the input authentication information. Then, the encrypted DEK is decrypted using the generated KEK. Alternatively, the access control module 181 may store the KEK as a part of the key information 312 in the nonvolatile memory 6. In this case, after the user using the user ID inputs the correct authentication information, the encrypted DEK is decrypted using the stored KEK.

Figure 5:
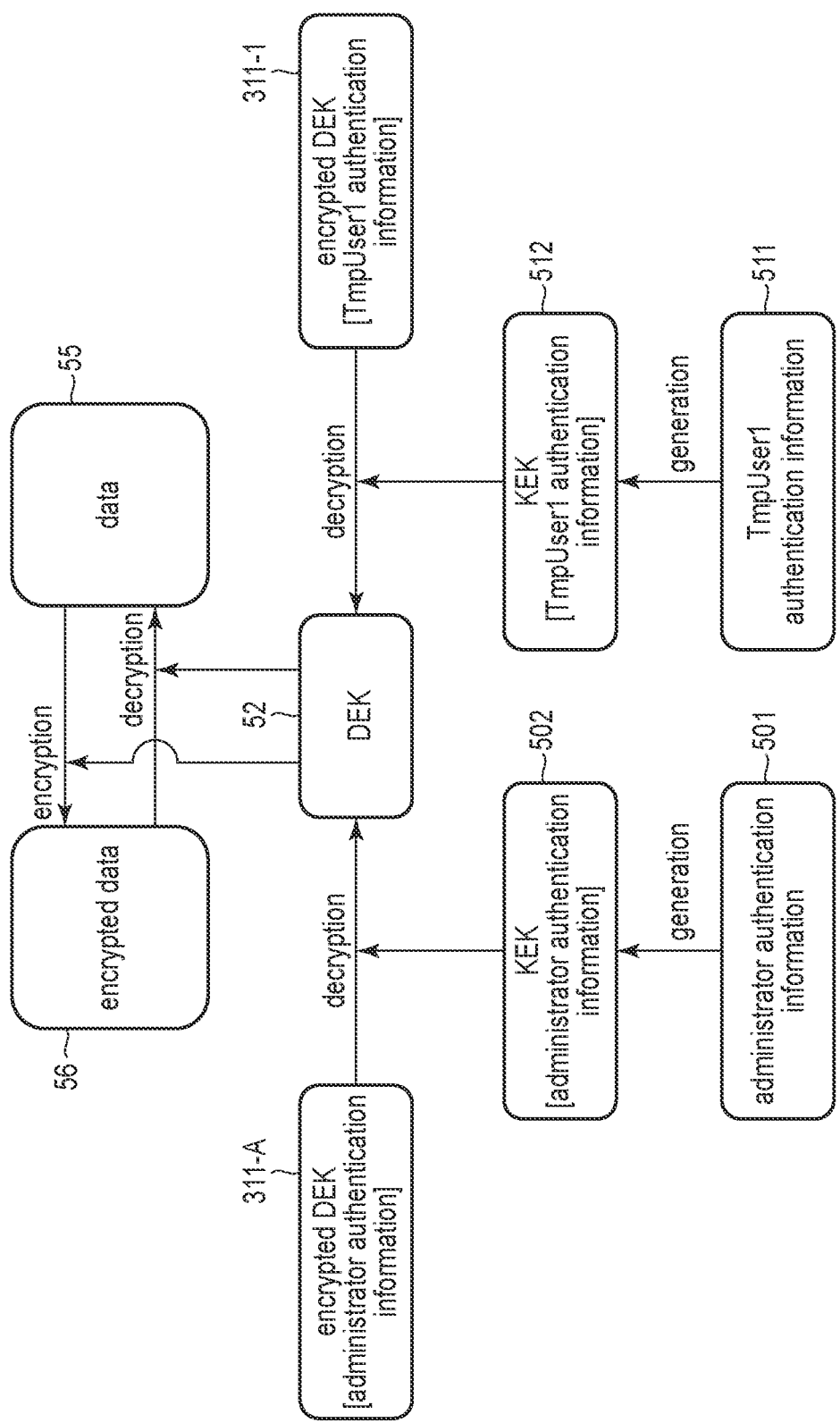
FIG. 5 is a view illustrating an example of a relationship between a data encryption key (DEK) used for encryption and decryption of data and authentication information in the memory system of the first embodiment.

FIG. 5 illustrates an example of a relationship between a DEK and authentication information. Here, a case where the access authorities to the Range1 for the administrator and TmpUser1 are enabled, and the administrator inputs correct authentication information 501 and a user who uses TmpUser1 inputs correct authentication information 511, will be described. Further, a DEK 52 is a DEK corresponding to the Range1. Access by the administrator and access by the user using TmpUser1 will be described later, respectively.

(1) Access by Administrator

The access control module 181 generates a KEK 502 using the administrator authentication information 501. Specifically, the access control module 181 generates the KEK 502 using, for example, the KDF with the administrator authentication information 501 and a random number as input values.

Next, the access control module 181 decrypts an encrypted DEK 311-A using the generated KEK 502, thereby obtaining the DEK 52. The encrypted DEK 311-A is an encrypted DEK obtained by encrypting the DEK 52 using the KEK 502. The encrypted DEK 311-A is generated, for example, when the access authority to the Range1 assigned to the administrator is enabled, and is stored in the nonvolatile memory 6 as a part of the key information 312. The access control module 181 sets the obtained DEK 52 in the encryption circuit 15.

As a result, when reading encrypted data 56 from the nonvolatile memory 6 in accordance with a read command that is associated with the administrator, the read control module 182 decrypts the encrypted data 56 into plaintext data 55 with the encryption circuit 15 in which the DEK 52 is set. Further, the write control module 183 obtains encrypted data 56 by encrypting plaintext data 55 (that is, user data to be written), which is received in accordance with reception of a write command associated with the administrator, with the encryption circuit 15 in which the DEK 52 is set.

(2) Access by User Using TmpUser1

The access control module 181 generates a KEY 512 using the authentication information 511 of TmpUser1. Specifically, the access control module 181 generates the KEK 512 using, for example, the KDF with the authentication information 511 and a random number as input values.

Next, the access control module 181 decrypts an encrypted DEK 311-1 using the generated KEK 512, thereby obtaining the DEK 52. The encrypted DEK 311-1 is an encrypted DEN obtained by encrypting the DEK 52 using the KEK 512. The encrypted DEK 311-1 is generated, for example, when the access authority to the Range1 assigned to TmpUser1 is enabled, and is stored in the nonvolatile memory 6 as a part of the key information 312. The access control module 181 sets the obtained DEK 52 in the encryption circuit 15.

As a result, when reading encrypted data 56 from the nonvolatile memory 6 in accordance with a read command that is associated with TmpUser1, the read control module 182 decrypts the encrypted data 56 into plaintext data 55 with the encryption circuit 15 in which the DEK 52 is set. Further, the write control module 183 obtains encrypted data 56 by encrypting plaintext data 55 (that is, user data to be written), which is received in accordance with reception of a write command associated with TmpUser1, with the encryption circuit 15 in which the DEK 52 is set.

The description will continue returning to FIG. 2. The access control module 181 determines whether the current time has exceeded a time limit of an enabled access authority periodically or when the memory system 3 is started as the power supply starts. Specifically, the access control module 181 acquires the current time from the RTC 17 ((9) in FIG. 2). The access control module 181 acquires the time limit of the enabled access authority from the temporary authority table 133 ((10) in FIG. 2). Then, the access control module 181 determines whether the current time has exceeded the time limit of the enabled access authority. In a case where a date or a date and time when the access authority becomes disabled is set as the time limit, the access control module 181 compares the current time with the time limit presented by the date or the date and time to determine whether the current time has exceeded the time limit.

When an enabling period starting from start time is set as the time limit, the access control module 181 acquires the start time and the enabling period of the enabled access authority from the temporary authority table 133. The access control module 181 determines end time at which the access authority becomes disabled by using the start time and the enabling period. The end time is represented by, for example, a date or a date and time. Then, the access control module 181 compares the current time with the end time to determine whether the current time has exceeded the time limit (that is, the end time).

In a case where the current time has exceeded the time limit of the enabled access authority, the access control module 181 updates the temporary authority table 133 to disable the access authority ((11) in FIG. 2). For example, the access control module 181 sets "false" in temporary authority enabled in a corresponding entry, sets the start time and the time limit to null, thereby disabling the access authority. As a result, the access control module 181 performs control such that access to the target area is not performed with the user ID corresponding to the access authority that is expired. Further, the access control module 181 discards, from the key information 312 of the nonvolatile memory 6, the encrypted DEK corresponding to the user ID whose access authority has been disabled.

Through the above operation, after the authentication of the administrator has been successful, the access control module 191 enables the access authority to the target area assigned to the user ID and sets the time limit at which the access authority becomes disabled in accordance with the setting command. Then, when the current time has exceeded the time limit, the access control module 191 automatically disables the access authority. As a result, the access control module 191 can perform control such that an intended user is capable of accessing the nonvolatile memory 6 during an intended period. In other words, it is possible to prevent an unintended user from accessing the nonvolatile memory 6 and to prevent a user from accessing the nonvolatile memory 6 during an unintended period. Therefore, the risk of data leakage and tampering can De reduced, and security for accessing to the nonvolatile memory 6 can be enhanced.

Figure 6:
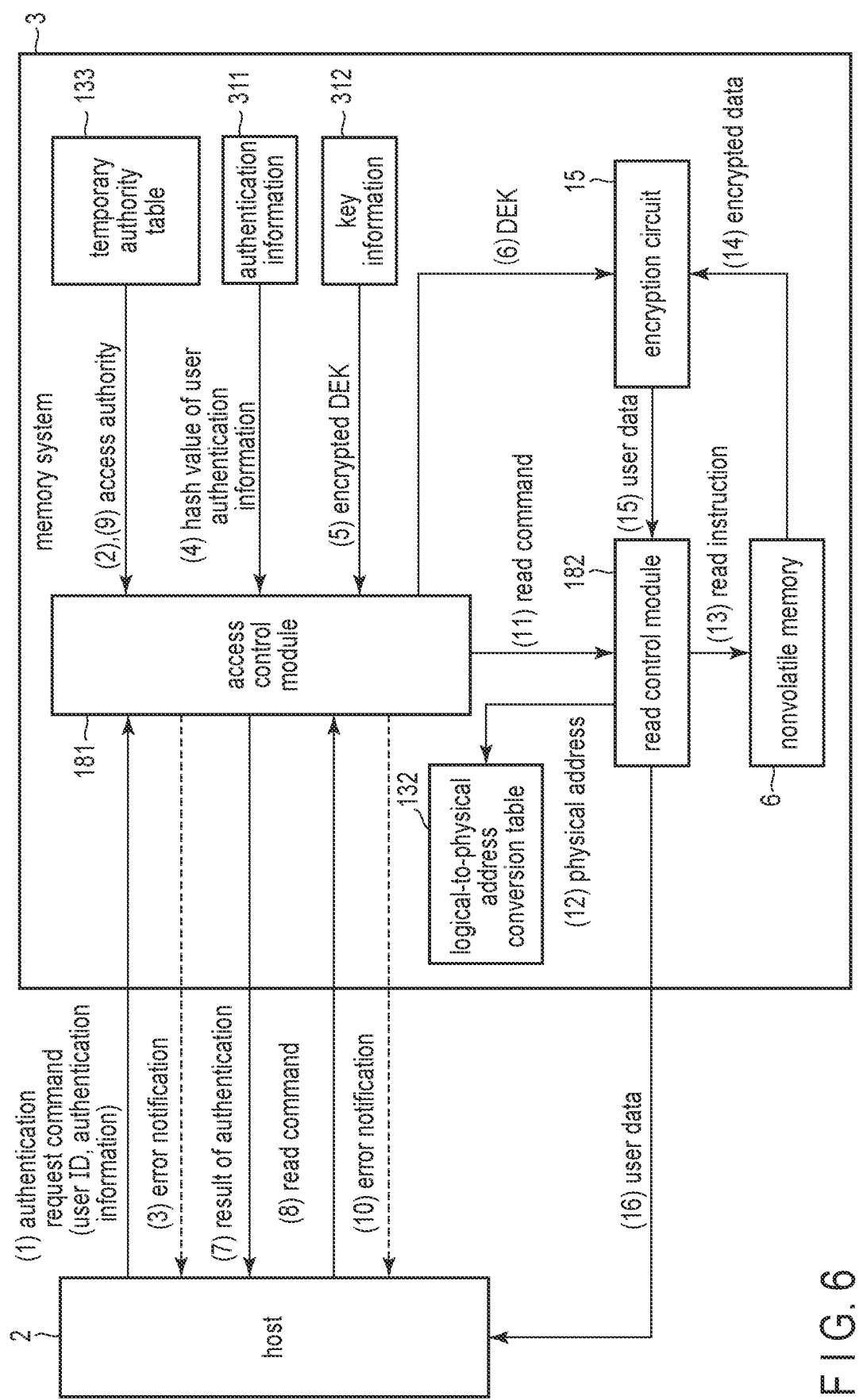
FIG. 6 is a diagram illustrating an example of a read operation depending on whether an access authority corresponding to a user ID is enabled in the memory system of the first embodiment.

FIG. 6 illustrates an example of a read operation depending on whether an access authority corresponding to a user ID is enabled or disabled. Read access to the memory system 3 using a user ID is performed after authentication of a user having the user ID has been successful. Therefore, the host 2 and the memory system 3 first perform a process for the user authentication.

Specifically, first, the host 2 transmits an authentication request command for a user to the memory system 3 ((1) in FIG. 6). The authentication request command includes, for example, a user ID and authentication information.

The access control module 181 of the memory system 3 determines whether an access authority assigned to the user ID is enabled or disabled using the temporary authority table 133 ((2) in FIG. 6). Specifically, the access control module 181 specifies an entry corresponding to the user ID in the temporary authority table 133. When temporary authority enabled of the specified entry is "true", the access control module 181 determines that the access authority assigned to the user ID is enabled. When the temporary authority enabled of the specified entry is "false", the access control module 181 determines that the access authority assigned to the user ID is disabled.

When the access authority assigned to the user ID is disabled, the access control module 181 notifies the host 2 of an error ((3) in FIG. 6).

When the access authority assigned to the user ID is enabled, the following operation is performed.

First, the access control module 181 calculates a hash value of the authentication information includes in the authentication request command. The access control module 181 acquires a hash value of authentication information of the user ID from the authentication information 311 ((4) in FIG. 6). When the calculated hash value matches the acquired hash value of the authentication information of the user ID, the access control module 181 determines that the authentication of the user has been successful.

Next, the access control module 181 acquires an encrypted DEK corresponding to the user ID from the key information 312 ((5) in FIG. 6). The access control module 181 decrypts the encrypted DEK using the authentication information included in the authentication request command, thereby acquiring a DEK. A method for decrypting the encrypted DEK using the authentication information is similar to that described above with reference to FIG. 5. The access control module 181 sets the DEK, which is obtained by the decryption, in the encryption circuit 15 ((6) in FIG. 6). Then, the access control module 181 notifies the host 2 of the successful authentication ((7) in FIG. 6).

Note that, when the calculated hash value is different from the acquired hash value of the authentication information of the user ID, the access control module 181 determines that the authentication of the user is not successful. In this case, the access control module 181 notifies the host 2 of the unsuccessful authentication ((7) in FIG. 6).

Hereinafter, an operation after the access control module 181 notifies the host 2 of successful user authentication will be described.

When being notified of successful user authentication, the host 2 transmits a read command, which is associated with the user ID of the user, to the memory system 3 ((8) in FIG. 6). This read command is a command that requests reading of data from a target area of an access authority assigned to the user ID.

The access control module 181 receives the read command transmitted by the host 2. The access control module 181 determines whether the access authority corresponding to the user ID associated with the read command is enabled or disabled using the temporary authority table 133 ((9) in FIG. 6). When the access authority corresponding to the user ID associated with the read command is disabled, the access control module 191 notifies the host 2 of an error ((10) in FIG. 6).

When the access authority corresponding to the user ID associated with the read command is enabled, the access control module 181 sends the read command to the read control module 182 ((11) in FIG. 6).

The read control module 182 specifies a physical address corresponding to an LBA designated in the read command by using the logical-to-physical address conversion table 132 ((12) in FIG. 6). Then, the read control module 182 instructs the nonvolatile memory 6 to read data from the specified physical address via the memory I/F 16 ((13) in FIG. 6). The nonvolatile memory 6 reads encrypted data from the specified physical address and sends the read encrypted data to the encryption circuit 15 ((14) in FIG. 62.

The encryption circuit 15 decrypts the encrypted data using the set DEK, thereby obtaining user data. The encryption circuit 15 sends the user data to the read control module 182 ((15) in FIG. 6). Note that the user data may be stored in the buffer 12. The read control module 182 transmits the user data to the host 2 via the host I/F 11 ((1.6) in FIG. 6).

Through the above operation, when the user uses the user ID whose access authority is enabled and has the authentication information corresponding to the user ID, the read control module 182 can read the encrypted data corresponding to the read command transmitted by the host 2 from the nonvolatile memory 6 (more specifically, the target area). Then, the read control module 182 can transmit the user data, which is obtained by decrypting the read encrypted data, to the host 2.

On the other hand, when the user uses the user ID whose access authority is disabled or does not have authentication information corresponding to the user ID, the memory system 3 does not execute a process in accordance with the read command associated with the user ID. Specifically, the access control module 181 notifies the host 2 of an error for the read command associated with the user ID. As a result, the access control module 181 can perform control such that the process in accordance with the read command is not executed in the memory system 3.

Figure 7:
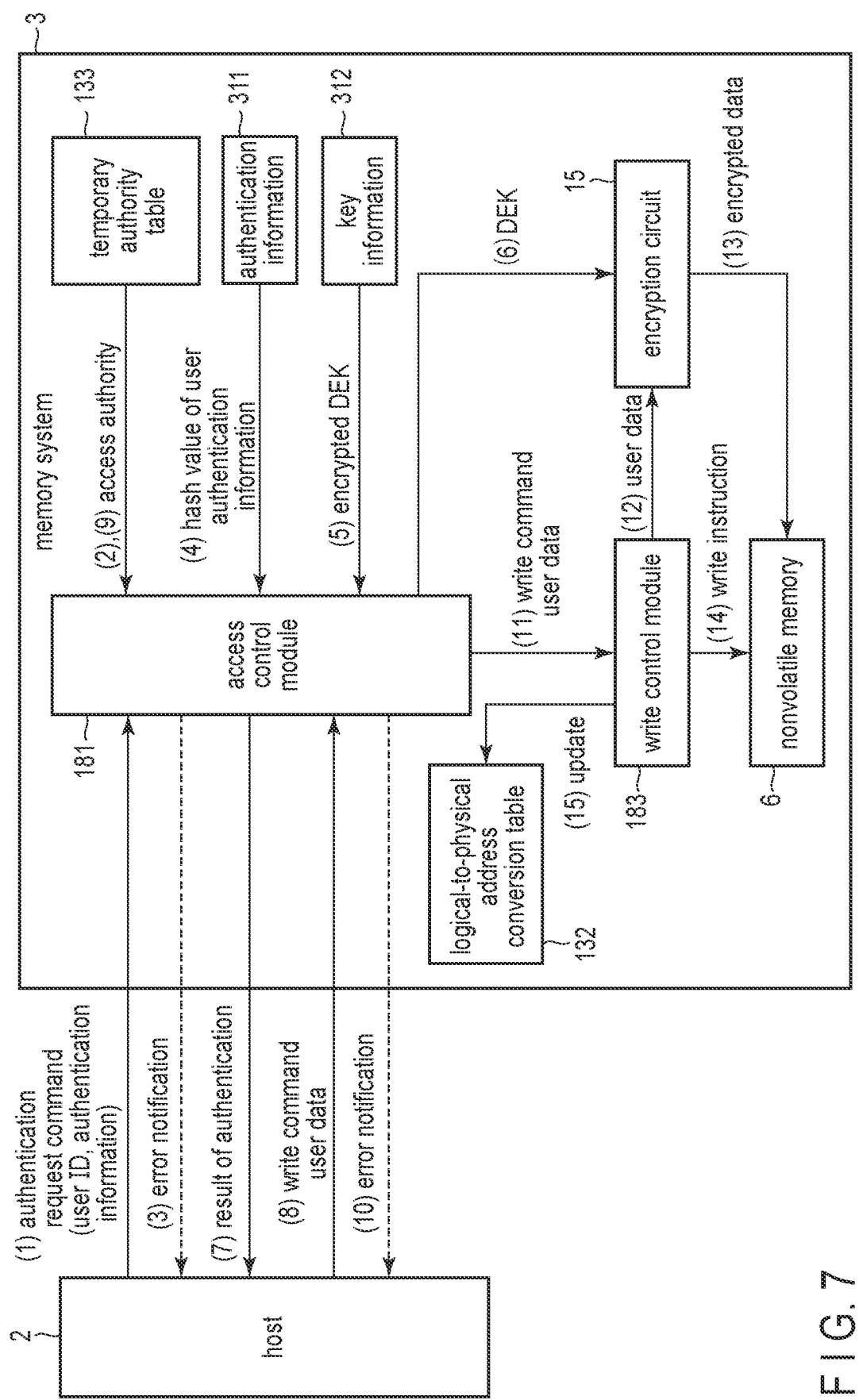
FIG. 7 is a diagram illustrating an example of a write operation depending on whether an access authority corresponding to a user ID is enabled in the memory system of the first embodiment.

FIG. 7 illustrates an example of a write operation depending on whether an access authority corresponding to a user ID is enabled or disabled. Write access to the memory system 3 using a user ID is performed after authentication of a user having the user ID has been successful. Therefore, the host 2 and the memory system 3 first perform a process for the user authentication. An operation up to transmission of an authentication request command from the host 2 to the memory system 3 and notification of an authentication result from the memory system 3 to the host 2 is similar to that described above with reference to FIG. 6.

Hereinafter, an operation after the access control module 181 notifies the host 2 of successful user authentication will be described.

When being notified of successful user authentication, the host 2 transmits a write command, which is associated with the user ID of the user, to the memory system 3 ((8) in FIG. 7). As the write command is received by the memory system 3, the host 2 transmits user data to be written into the memory system 3 ((8) in FIG. 7). This write command is a command that requests writing of the user data to a target area of an access authority assigned to the user ID.

The access control module 181 receives the write command transmitted by the host 2. The access control module 181 receives the user data to be written from the host 2 in accordance with the reception of the write command. The received user data may be stored in the buffer 12. The access control module 181 determines whether the access authority corresponding to the user ID associated with the write command is enabled or disabled using the temporary authority table 133 ((9) in FIG. 7). When the access authority corresponding to the user ID associated with the write command is disabled, the access control module 181 notifies the host 2 of an error ((10) in FIG. 7).

When the access authority corresponding to the user ID associated with the write command is enabled, the access control module 181 sends the write command and the user data to the write control module 183 ((11) in FIG. 7). The write control module 183 sends the user data to the encryption circuit 15 ((12) in FIG. 7).

The encryption circuit 15 encrypts the user data using the set DEK. As a result, the encrypted data is obtained. The encryption circuit 15 sends the encrypted data to the nonvolatile memory 6 via the memory I/F 16 ((13) in FIG. 7).

Further, the write control module 183 instructs the nonvolatile memory 6 to write the encrypted data via the memory I/F 16 ((14) in FIG. 7). As a result, the encrypted data is written into the nonvolatile memory 6 (more specifically, the target area of the access authority corresponding to the user ID). Then, the write control module 183 updates the logical-to-physical address conversion table 132 so as to indicate a correspondence between a physical address in which the encrypted data has been written and an LBA ((15) in FIG. 7).

Through the above operation, when the user uses the user ID whose access authority is enabled and has the authentication information corresponding to the user ID, the write control module 183 can encrypt the user data to be written, which is transmitted together with the write command by the host 2, and write the encrypted user data into the nonvolatile memory 6.

On the other hand, when the user uses the user ID whose access authority is disabled or does not have authentication information corresponding to the user ID, the memory system 3 does not execute a process in accordance with the write command associated with the user ID. Specifically, the access control module 181 notifies the host 2 of an error for the write command associated with the user ID. As a result, the access control module 181 can perform control such that the process in accordance with the write command is not executed in the memory system 3.

Note that the operations illustrated In FIGS. 6 and 7 may be applied to various access commands that may cause access to the nonvolatile memory 6 without being limited to the read command and the write command. That is, in a case where an access command associated with a user ID is received from the host 2, the access control module 181 performs control such that a process corresponding to the access command is executed when an access authority corresponding to the user ID is enabled. On the other hand, when the access authority corresponding to the user ID is disabled, the access control module 181 performs control such that the process corresponding to the access command is not executed.

Meanwhile, one user ID may be used by multiple users.

Figure 8:
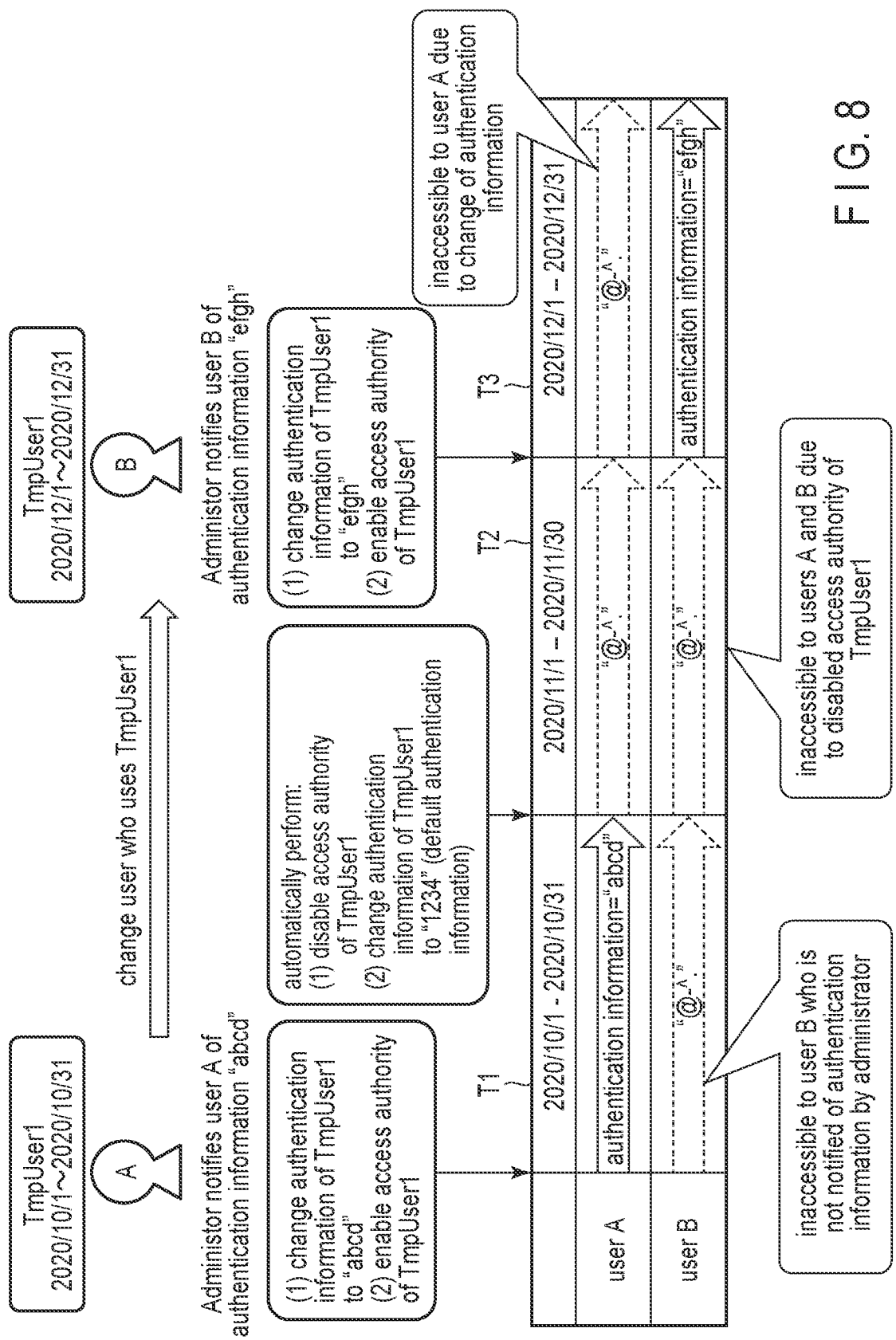
FIG. 8 is a view illustrating an example of access control when a user ID is used by multiple users in the memory system of the first embodiment.

FIG. 8 illustrates an example of access control in a case where one user ID "TmpUser1" is used by two users of a user A and a user B. Here, a case where TmpUser1 is allocated to the user A during a first period T1, is not allocated to any user during a second period T2, and is allocated to the user B during a third period T3 will be explained. The first period T1 is a period from Oct. 1, 2020 to Oct. 31, 2020. The second period T2 is a period from Nov. 1, 2020 to Nov. 30, 2020. The third period T3 is a period from Dec. 1, 2020 to Dec. 31, 2020. Further, a target area of an access authority assigned to TmpUser1 is a Range1 in the nonvolatile memory 6.

First, when TmpUser1 is assigned to the user A during the first period T1, the administrator notifies the user A of authentication information of TmpUser1 "abcd". The administrator may notify the user A of the first period T1 during which the user A is capable of accessing the memory system 3.

The host 2 transmits a first setting command to the memory system 3 according to an operation by the administrator. The first setting command is a command for setting TmpUser1 to enable the access authority to the Range1 from Oct. 1, 2020 to Oct. 31, 2020. Further, the first setting command includes the authentication information of TmpUser1 "abcd".

The access control module 181 of the memory system 3 changes authentication information of TmpUser1 to "abcd" in accordance with the first setting command. More specifically, the access control module 181 calculates a hash value of the new authentication information "abcd". The access control module 181 replaces a hash value of authentication information of TmpUser1 stored as the authentication information 311 with the calculated hash value of "abcd".

Then, the access control module 181 enables the access authority of TmpUser1 to the Range1.

As a result, the user A can access the Range1 using the authentication information of TmpUser1 "abcd", which is notified by the administrator, during the first period T1. Note that the user B is not notified of the authentication information of TmpUser1 "abcd" by the administrator. Therefore, the user B cannot access the Range1 during the first period T1.

In a case where the current time has exceeded Oct. 31, 2020 (for example, on Nov. 1, 2020), the access control module 181 automatically performs disabling the access authority of TmpUser1 to the Range1 and changing the authentication information of TmpUser1 from "abcd" to default authentication information "1234".

As a result, since the access authority assigned to TmpUser1 is disabled during the second period T2, the user A and the user B cannot access the Range1.

Next, when TmpUser1 Is assigned to the user B during the third period T3, the administrator notifies the user B of new authentication information of TmpUser1. "efgh". The administrator may notify the user B of the third period T3 during which the user B is capable of accessing the memory system 3.

The host 2 transmits a second setting command to the memory system 3 according to an operation by the administrator. The second setting command is a command for setting TmpUser1 to be assigned with the access authority to the Range1 from Dec. 1, 2020 to Dec. 31, 2020. Further, the second setting command includes the authentication information of TmpUser1 "efgh".

The access control module 181 changes the authentication information of TmpUser1 to "efgh" in accordance with the second setting command. Then, the access control module 181 enables the access authority of TmpUser1 to the Range1.

As a result, the user B can access the Range1 using the authentication information of TmpUser1 "efgh", which is notified by the administrator, during the third period T3. Further, the user A cannot access the Range1 during the third period T3 since the authentication information of TmpUser1 is changed from "1234" to "efgh". That is, even in the case where the access authority of TmpUser1 that was used during the first period T1 is enabled, the user A cannot access the Range1 during the third period T3 since the user A does not know the authentication information of TmpUser1. As a result, it is possible to prevent the user A from accessing the Range1 during the unintended third period T3.

Further, in a case where the current time has exceeded Dec. 31, 2020 (for example, on Jan. 1, 2021), the access control module 181 automatically performs disabling the access authority of TmpUser1 to the Range1 and changing the authentication information of TmpUser1 from "efgh" to default authentication information "1234".

As described above, even in the case where the multiple users use one user ED "TmpUser1", it is possible to perform control such that only the user intended by the administrator can access the Range. of the nonvolatile memory 6 during the period intended by the administrator by enabling and disabling the access authority assigned to TmpUser1 and changing the authentication information of TmpUser1. Therefore, the risk of data leakage and tampering can be reduced, and security for accessing to the nonvolatile memory 6 can be enhanced.

In a memory system according to a comparative example, a DEK is discarded, for example, to discard user data written in a nonvolatile memory when the current time has exceeded the time limit of a user ID. That is, since the DEK is discarded, it is impossible to decrypt encrypted data, which is encrypted using the DEK and is written in the nonvolatile memory, and thus, the encrypted data is substantially discarded.

On the other hand, in the memory system 3 of the embodiment, the encrypted DEK corresponding to the user ID is discarded without discarding the DEK when the current time has exceeded the time limit of the user ID. In a case where the encrypted DEK is discarded, the DEK is not obtained by means of decrypting the encrypted DEK.

In the memory system 3 of the embodiment, the VEX is not discarded even when the current time has exceeded the time limit of the user ID. Therefore, a user to which an access authority is newly set can use the user data previously stored in the nonvolatile memory 6 using the previously used user ID.

For example, the case illustrated in FIG. 8 will be described.

Daring the first period T1, the access authority of TmpUser1 to the Range1 is assigned to the user A. At this time, the access control module 181 generates the encrypted DEK by encrypting the DEK of the Range1 using the authentication information of TmpUser1 "abcd" (more specifically, using a KEK generated by using the authentication information "abcd"). The access control module 181 stores the generated encrypted DEK in the nonvolatile memory 6 as a part of the key information 312. User data according to the write access by the user A who uses TmpUser1 is encrypted with the DEK of the Range1. This DEK is obtained by decrypting the encrypted DEK using the authentication information "abcd" (more specifically, using the KEK generated by using the authentication information "abcd"). The encrypted data is written into the Range1 of the nonvolatile memory 6. During the first period T1, the encrypted DEK is stored in the nonvolatile memory 6 as a part of the key information 312.

When the current time has exceeded the time limit of TmpUser1, the encrypted DEK corresponding to TmpUser1 is discarded. Therefore, it is impossible to obtain the DEK from the encrypted DEK corresponding to TmpUser1 during the second period T2. Therefore, it is impossible for the user who uses TmpUser1 to decrypt encrypted data read from the Range1 during the second period T2.

Next, during the third period T3, the access authority of TmpUser1 to the Range1 is assigned to the user B. At this time, the access control module 181 generates an encrypted DEK by encrypting the DEK of the Range1 using the authentication information of TmpUser1 "efgh" (more specifically, using a KEK generated by using the authentication information "efgh"). The access control module 181 stores the generated encrypted DEK in the nonvolatile memory 6 as a part of the key information 312.

Encrypted data is read from the Range1 in accordance with a read command by the user B who uses TmpUser1. The access control module 181 acquires the DEK of the Range1 by decrypting the encrypted DEK using the authentication information "efgh" (more specifically, using the KEK generated by using the authentication information "efgh"). The encrypted data read from the Range1 is decrypted with the DEK of the Range1.

The user data obtained by the decryption may be user data which is encrypted with the DEK of the Range1 and is written in the nonvolatile memory 6 in accordance with write access by the user A to which the access authority of TmpUser1 was previously assigned. Therefore, the user B to which the access authority of TmpUser1 is newly assigned can use the user data previously written in the Range1 by the user A by using TmpUser1 that was previously assigned to the user A.

In this manner, when the current time has exceeded the time limit of TmpUser1, the memory system 3 of the embodiment discards the encrypted DEK corresponding to TmpUser1 without discarding the DEK. As a result, the user to which the access authority of TmpUser1 is newly set can use the user data previously stored in the nonvolatile memory 6 by the other user using TmpUser1.

Figure 9:
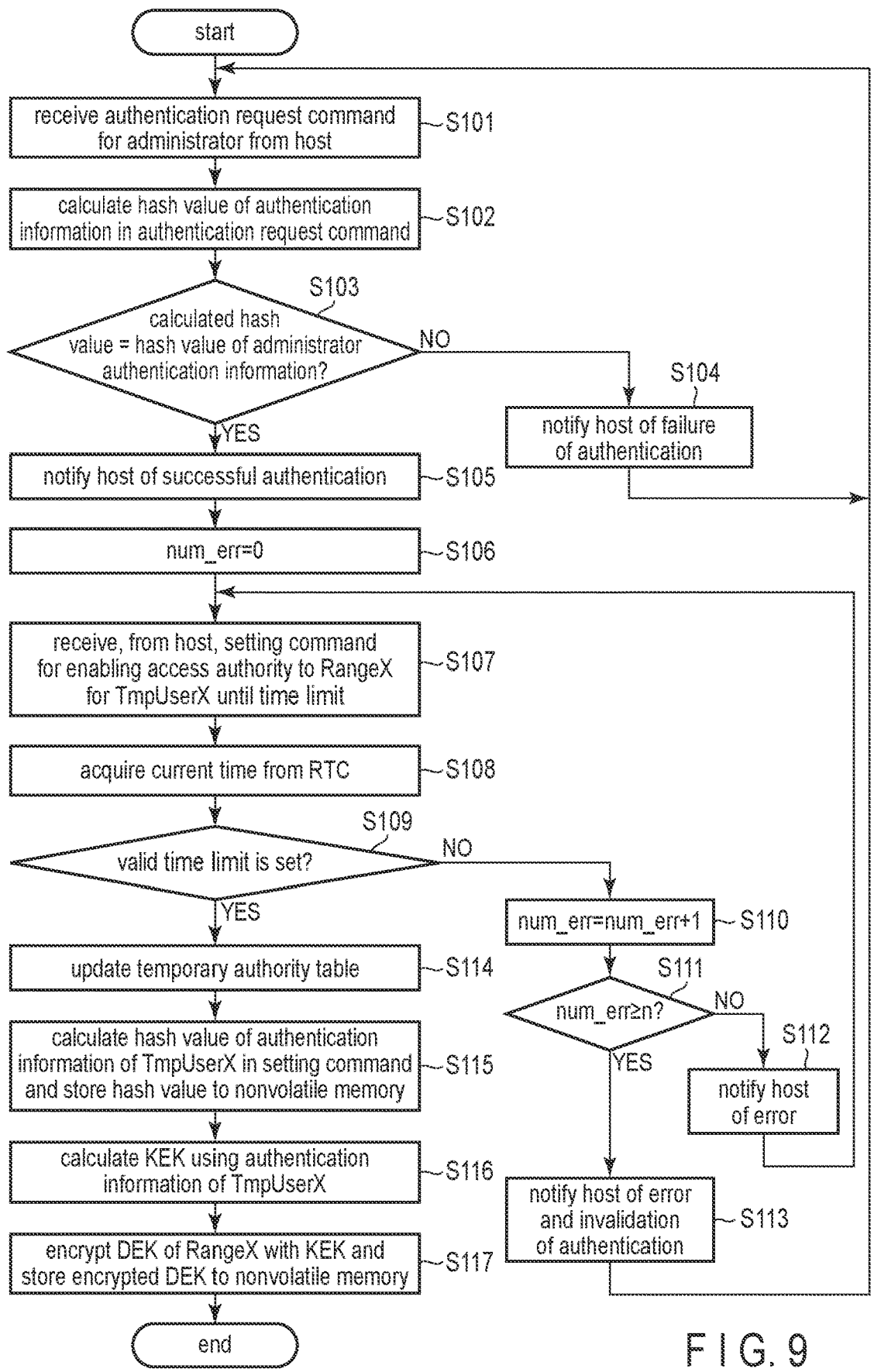
FIG. 9 is a flowchart illustrating an example of the procedure of an authority setting process executed in the memory system of the first embodiment.

FIG. 9 is a flowchart illustrating an example of the procedure of an authority setting process executed by the CPU 18. The authority setting process is n process for enabling an access authority to at least partial storage area of the nonvolatile memory 6, which is assigned to a user ID.

First, the CPU 18 receives an authentication request command for an administrator from the host 2 (step S101). The CPU 18 calculates a hash value of authentication information included in the authentication request command (step S102).

The CPU 1P determines whether the calculated hash value is equal to a hash value of authentication information of the administrator (step S103). The authentication information of the administrator or the hash value of the authentication information of the administrator is stored, for example, in the nonvolatile memory 6 as the authentication information 311.

When the calculated hash value is different from the hash value of the authentication information of the administrator (NO in step S103), the CPU 18 notifies the host 2 of a failure of the authentication of the administrator (step S104), and the processing of the CPU 18 returns to step S101.

When the calculated hash value is equal to the hash value of the authentication information of the administrator (YES in step S103), the CPU 18 notifies the host 2 of the successful authentication of the administrator (step S105). The CPU 18 sets a variable num_err to zero (step S106). The variable num_err indicates the number of times an error related to a setting command has occurred since the successful authentication of the administrator. Then, the CPU 18 receives a setting command from the host 2 (step S107). This setting command is a command for assigning a user ID "TmpUserX" an access authority to RangeX in the nonvolatile memory 6 that is enabled until a specific time limit.

The CPU 18 acquires the current time from the RTC 17 (step S108). The CPU 18 determines whether a valid time limit is set to the received setting command (step S109). The CPU 18 determines that the valid time limit is not set in the setting command, for example, in a case where any one of (1) a date or a date and time that does not exist (2) a date or a date and time in the past, and (3) a period exceeding a threshold is set as the time limit.

When a valid time limit is not set in the setting command (NO in step S109), the CPU 18 adds one to num_err (step S110). Then, the CPU 18 determines whether num_err is equal to or larger than n (step S111). Here, n that indicates the maximum number of times an error occurs is an integer of one or more. For example, n is a default value or a value determined by the administrator. When num_err is smaller than n (NO in step S111), the CPU 18 notifies the host 2 of an error (step S112), and the processing of the CPU 13 returns to step S147. When num_err is equal to or larger than n (YES in step S111), the CPU 18 notifies the host 2 of the error and invalidation of authentication (step S113), and the processing of the CPU 18 returns to step S101.

When the valid time limit is set in the setting command (YES in step S109), the CPU 18 updates the temporary authority table 133 on the basis of the current time acquired from the RTC 17 and the setting command (step S114). Specifically, the CPU 18 specifies an entry that includes a user ID indicated in the setting command from the temporary authority table 133. Then, the CPU 18 sets "true" to the temporary authority enabled of the specified entry. The CPU 18 sets the current time as the start time of the specified entry. Further, the CPU 18 sets the time limit indicated in the setting command as the time limit of the specified entry. As the temporary authority table 133 is updated, the access authority to the RangeX assigned to TmpUserX is enabled with the time limit.

Next, the CPU 18 calculates a hash value of authentication information by using authentication information of TmpUserX included in the setting command, and stores the hash value in the nonvolatile memory 6 (step S115). The CPU 18 calculates a KEK using the authentication information of TmpUserX included in the setting command (step S116). Then, the CPU 18 encrypts a DEK of the RangeX using the KEK, stores the encrypted DEK in the nonvolatile memory 6 (step S117), and ends the authority setting process.

Through the authority setting process described above, the CPU 18 can enable the access authority to the RangeX assigned to TmpUserX with the time limit according to the setting command after the authentication of the administrator has been successful.

Figure 10:
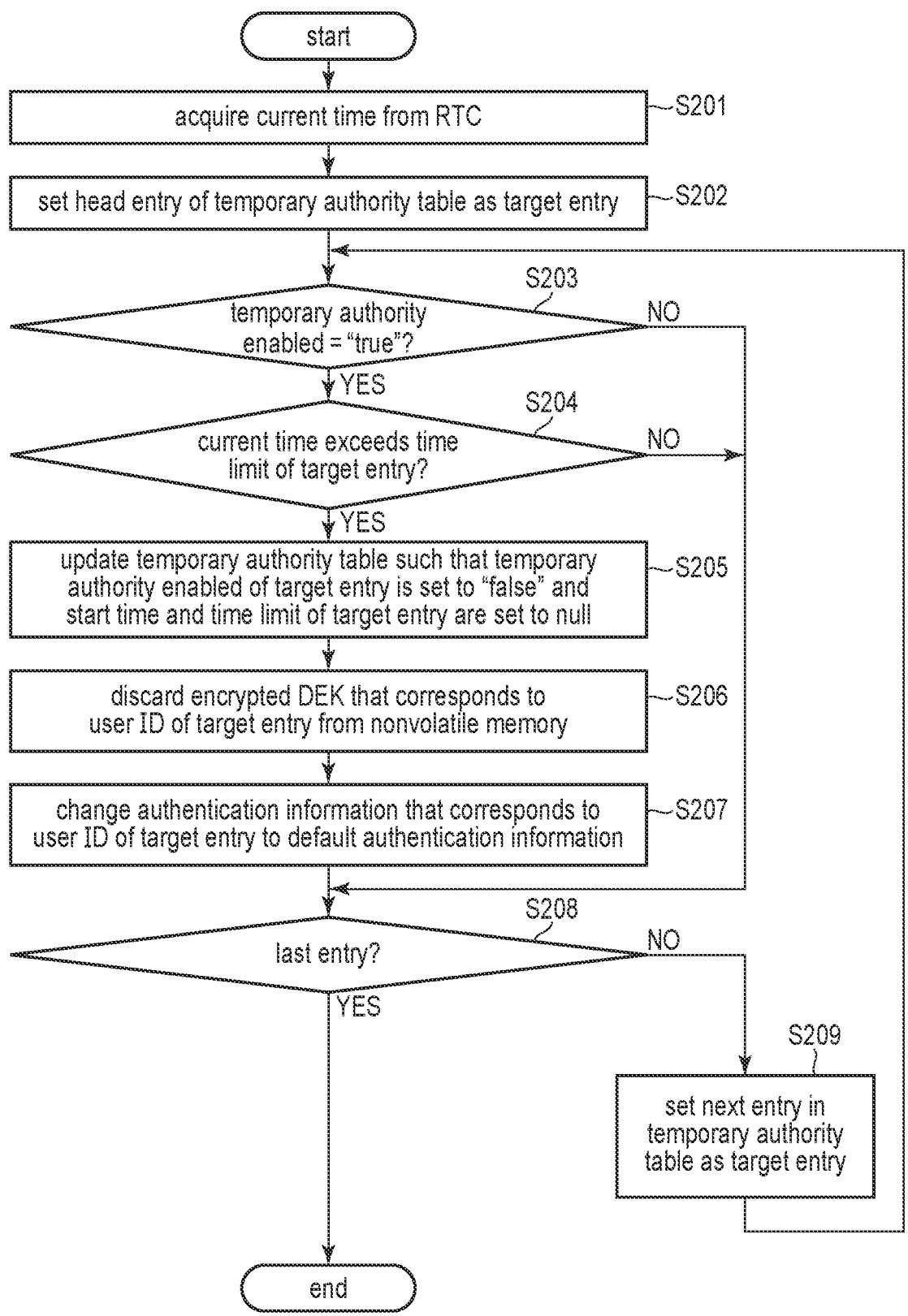
FIG. 10 is a flowchart illustrating an example of the procedure of an authority disabling process executed in the memory system of the first embodiment.

FIG. 10 is a flowchart illustrating an example of the procedure of an authority disabling process executed by the CPU 18. The authority disabling process is a process for disabling an access authority that is expired. The CPU 18 executes the authority disabling process, for example, in response to the start of power supply to the memory system 3. Further, the CPU 18 may execute the authority disabling process periodically (for example, once a day, once a month).

The CPU 18 acquires the current time from the RTC 17 (step S201). Then, the CPU 18 sets a head entry of the temporary authority table 133 as a target entry (step S202).

Next, the CPU 18 determines whether the temporary authority enabled of the target entry is "true" (step S203). When the temporary authority enabled of the target entry is "false" (NO in step S203), an access authority assigned to the user ID of the target entry is disabled, and thus, the processing of the CPU 18 proceeds to step S208.

When the temporary authority enabled of the target entry is "true" (YES in step S203), the CPU 18 determines whether the current time has exceeded the time limit indicated in the target entry (step S204). When the current time does not exceed the time limit indicated in the target entry (NO in step S204), the processing of the CPU 18 proceeds to step 3208. In this case, the CPU 18 does not make any change to the target entry. Therefore, the access authority assigned to the user ID of the target entry is maintained in an enabled state.

On the other hand, when the current time exceeds the time limit indicated in the target entry (YES in step S204), the CPU 18 updates the temporary authority table 133 such that the temporary authority enabled of the target entry is set to "false" and the start time and the time limit of the target entry are set to null (step S205). Further, the CPU 18 discards an encrypted DEK corresponding to the user ID of the target entry from the nonvolatile memory 6 (step S206). The CPU 18 changes the authentication information 311 corresponding to the user ID of the target entry to authentication information set in advance by the administrator (that is, default authentication information) (step S207), and the processing of the CPU 18 proceeds to step S208. As a result, the access authority of the user ID that is expired can be disabled, and the authentication information of the user ID can be changed.

Next, the CPU 18 determines whether the target entry is the last entry of the temporary authority table 133 (step S208). When the target entry is not the last entry (NO in step 3208), the CPU 18 sets an entry next to the target entry in the temporary authority table 133 as a new target entry (step S209), and the processing of the CPU 18 proceeds to step S203. That is, whether to disable an access authority is determined regarding a user ID of the new target entry, and processing for disabling the access authority is performed if necessary.

When the target entry is the last entry (YES in step S208), the CPU 18 ends the authority disabling process.

Through the authority disabling process described above, the CPU 18 can disable the access authority assigned to the user ID when the current time has exceeded the time limit. In this case, the administrator does not need to perform an operation of issuing a setting command for disabling at a timing when the access authority assigned to the user ID needs to be disabled. Therefore, it is possible to prevent the access authority of the user ID that needs to be disabled from remaining in the enabled state due to the mistake in the command operation. Therefore, the risk of data leakage and tampering can be reduced, and security for accessing to the nonvolatile memory 6 can be enhanced.

Figure 11:
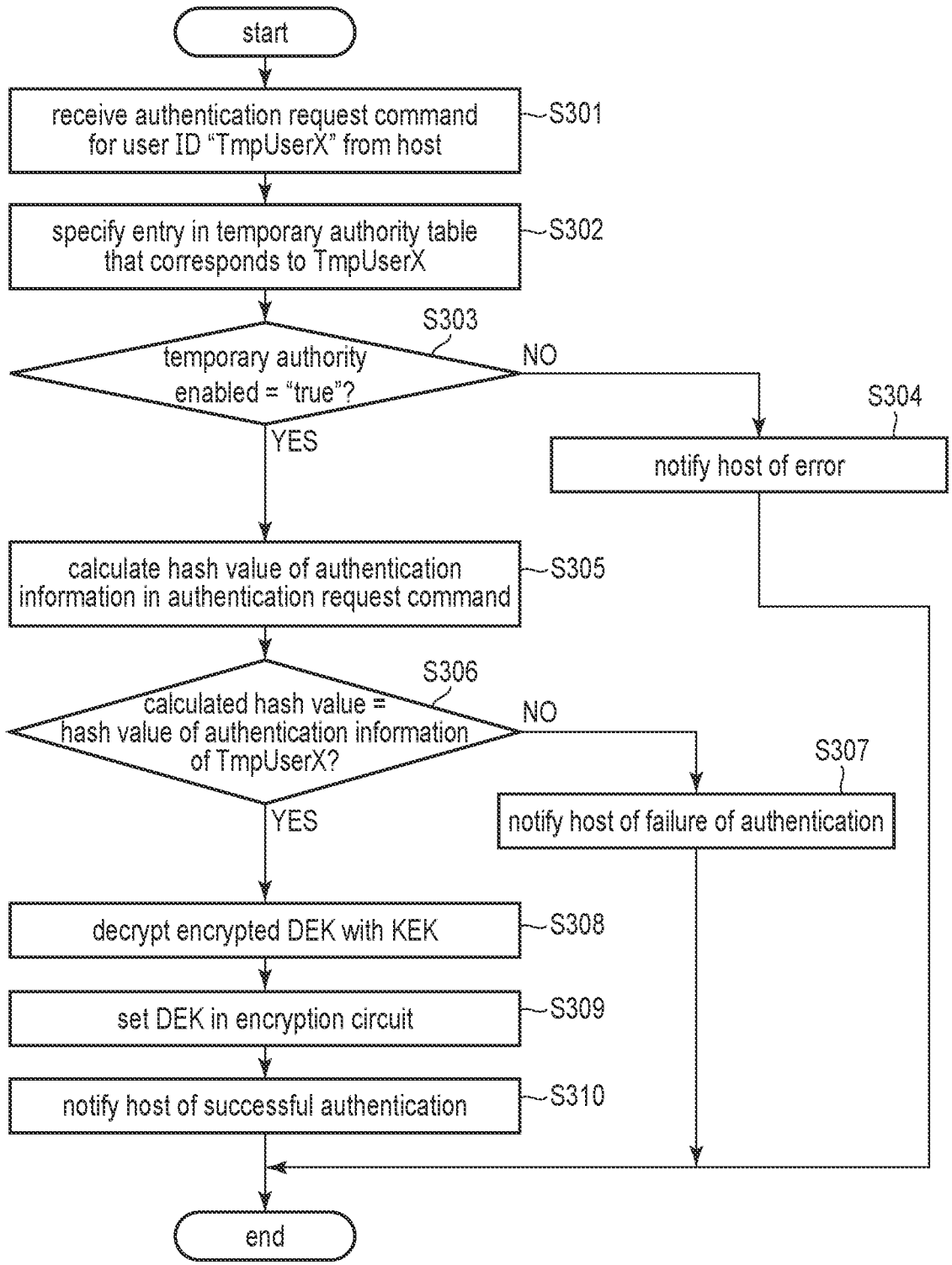
FIG. 11 is a flowchart illustrating an example of the procedure of a user authentication process executed in the memory system of the first embodiment.

FIG. 11 is a flowchart illustrating an example of the procedure of a user authentication process executed by the CPU 18. The user authentication process is a process for authenticating a user by using a user ID. For example, the CPU 18 is configured to execute the user authentication process after power supply to the memory system 3 is started and the authority setting process described above with reference to the flowchart of FIG. 9 is executed. That is, the user authentication process is not executed before the execution of the authority setting process is completed.

First, the CPU 18 receives an authentication request command for a user ID "TmpUserX" from the host 2 (step S301). The CPU 18 specifies an entry in the temporary authority table 133 that corresponds to the user ID "TmpUserX" designated in the authentication request command (step S302).

The CPU 18 determines whether the temporary authority enabled of the specified entry is "true" (step S303). When the temporary authority enabled is "false" (NO in step S303), the CPU 18 notifies the host 2 of an error since an access authority assigned to TmpUserX is disabled (step S304), and ends the user authentication process.

When the temporary authority enabled is "true" (YES in step S303), the CPU 18 calculates a hash value of authentication information included in the authentication request command (step S305). Then, the CPU 18 determines whether the calculated hash value is equal to a hash value of authentication information of TmpUserX (step S306). The authentication information of TmpUserX or the hash value of the authentication information of TmpUserX is stored, for example, in the nonvolatile memory 6 as the authentication information 311.

When the calculated hash value is different from the hash value of the authentication information of TmpUserX (NO in step S306), the CPU 18 notifies the host 2 of a failure of the authentication of TmpUserX (step S307), and ends the user authentication process.

When the calculated hash value is equal to the hash value of the authentication information of TmpUserX (YES in step S306), the CPU 18 decrypts an encrypted DEK using the KEK (step S308). The encrypted DEK is data obtained by encrypting a DEK for accessing a RangeX in the nonvolatile memory 6 with the KEK. Further, the RangeX is a target area of the access authority assigned to TmpUserX. The KEK is stored in the nonvolatile memory 6 as a part of the key information 312. Alternatively, the KEK may be generated using the authentication information of TmpUserX and a random number that is stored in the nonvolatile memory 6 as a part of the key information 312.

The CPU 16 sets the DEK obtained by the decryption in the encryption circuit 15 (step S309). Then, the CPU 18 notifies the host 2 of the successful authentication of TmpUserX (step S310), and ends the user authentication process.

Through the user authentication process described above, in a case where the authentication of the user ID "TmpUserX" is requested and the access authority assigned to TmpUserX is disabled (that is, when the temporary authority enabled is "false"), the CPU 18 notifies the host 2 of an error without executing the authentication process of TmpUserX using the authentication information included in the authentication request. Therefore, for example, when the user who uses TmpUserX requests access to the nonvolatile memory 6 after the time limit, the CPU 19 can reject the access.

Further, in a case where the authentication of the user ID "TmpUserX" is requested and the access authority assigned to TmpUserX is enabled (that is, when the temporary authority enabled is "true"), the CPU 18 executes the authentication process of TmpUserX using the authentication information included in the authentication request. When the authentication has been successful, the CPU 18 can set the DEK of the RangeX, which is the target of the access authority assigned to TmpUserX, in the encryption circuit 15. The CPU 18 can access the RangeX in accordance with an access command associated with TmpUserX by using the encryption circuit 15 in which the DEK is set. That is, the CPU 18 can encrypt data to be written into the RangeX and decrypt data read from the RangeX using the encryption circuit 15.

On the other hand, when the authentications is not successful, the CPU 18 notifies the host 2 of the unsuccessful authentication. Therefore, after the user who uses TmpUserX is changed and the authentication information for TmpUserX is changed, the CPU 18 can reject access to the RangeX by the previous user.

Figure 12:
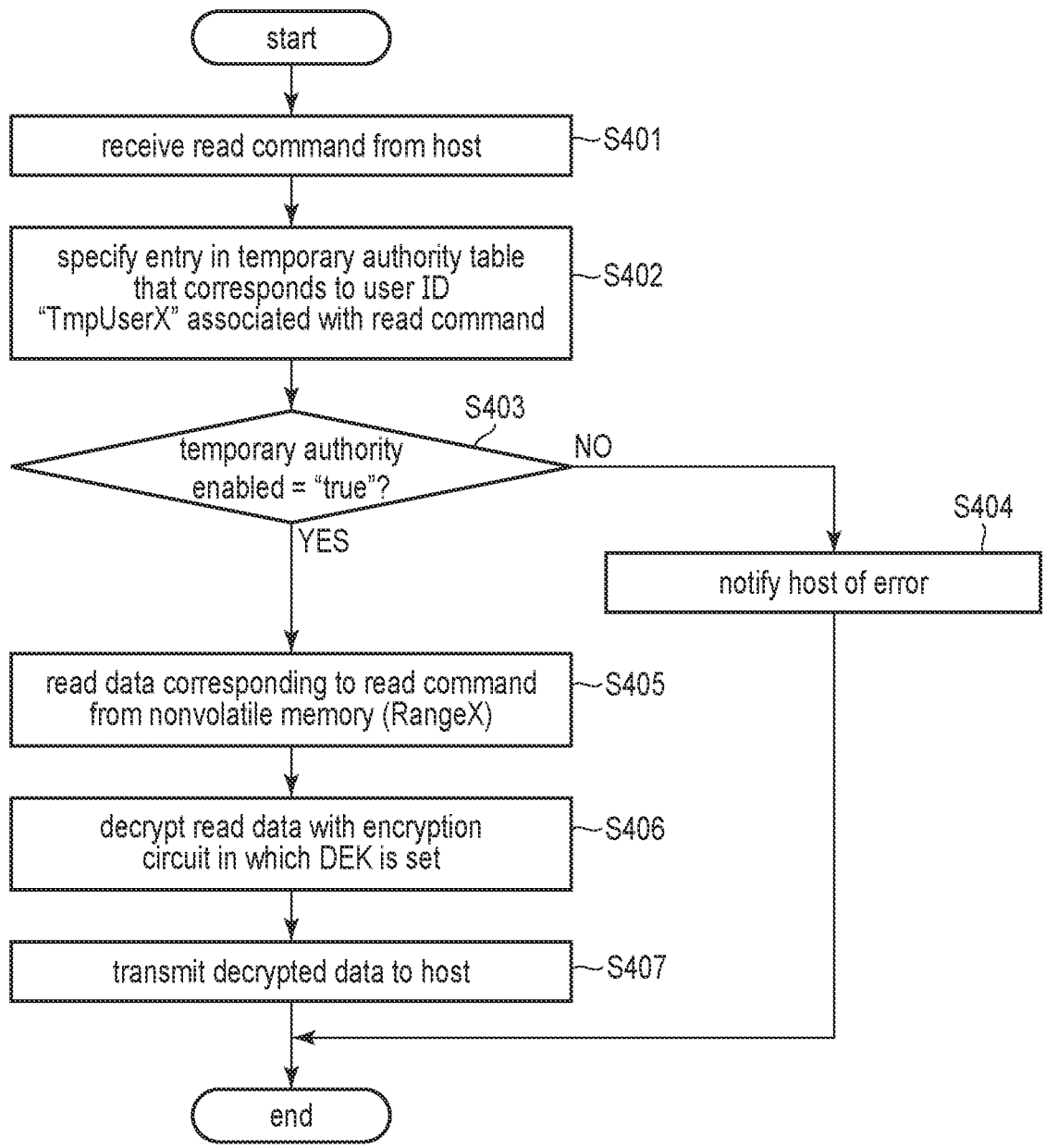
FIG. 12 is a flowchart illustrating an example of the procedure of a read command process executed in the memory system of the first embodiment.

FIG. 12 is a flowchart illustrating an example of the procedure of a read command process executed by the CPU 18. The CPU 18 executes the read command process after the user authentication process described above with reference to FIG. 11, for example.

The CPU 18 receives a read command from the host 2 (step S401). Here, a case where a user ID used by a user who has issued the read command is "TmpUserX" will be described. That is, the read command is associated with TmpUserX. Further, a target area of an access authority assigned to TmpUserX is a RangeX.

The CPU 18 specifies an entry in the temporary authority table 133 that corresponds to TmpUserX (step S402). Then, the CPU 18 determines whether the temporary authority enabled of the specified entry is "true" (step S403).

When the temporary authority enabled is "false" (NO in step S403), the CPU 18 notifies the host 2 of an error (step S404) and ends the read command process. That is, the CPU 18 ends the read command process without executing processing for reading data from the nonvolatile memory 6 in accordance with the read command.

When the temporary authority enabled is "true" (YES in step S403), the CPU 18 reads data corresponding to the read command from the nonvolatile memory 6 (step S405). More specifically, the CPU 18 specifies a physical address corresponding to an LBA designated in the read command by using the logical-to-physical address conversion table 132. Then, the CPU 18 reads data from the specified physical address in the nonvolatile memory 6.

The CPU 18 decrypts the read data with the encryption circuit 15 in which a DEK is set (step S406). This DEK is the DEK set in step S310 of the user authentication process described with reference to FIG. 11. That is, the DEK is the DEK of the RangeX as the target of the access authority assigned to TmpUserX. The CPU 18 transmits the decrypted data to the host 2 (step S407), and ends the read command process.

Through the above read command process, in a case where the read command associated with TmpUserX is received and the access authority assigned to TmpUserX is disabled (that is, when the temporary authority enabled is "false"), the CPU 18 can notify the host 2 of an error without executing the read process in accordance with the read command. Therefore, for example, when the user who uses TmpUserX requests read access to the nonvolatile memory 6 after the time limit, the CPU 18 can reject the read access.

Further, in a case where the read command associated with TmpUserX is received and the access authority assigned to TmpUserX is enabled (that is, when the temporary authority enabled is "true"), the CPU 18 can read data corresponding to the read command from the nonvolatile memory 6 and decrypt the read data.

FIG. 13 is a flowchart illustrating an example of the procedure of a write command process executed by the CPU 16. The CPU 18 executes the write command process after the user authentication process described above with reference to FIG. 11, for example.

The CPU 38 receives a write command from the host 2 (step S501). Here, a case where a user ID indicative of a user who has issued the write command is "TmpUserX" will be described. That is, the write command is associated with TmpUserX. Further, a target area of an access authority assigned to TmpUserX is a RangeX. The CPU 13 receives, from the host 2, user data to be written that is transmitted together with the received write command (step S52).

The CPU 18 specifies an entry in the temporary authority table 133 that corresponds to TmpUserX (step S503). Then, the CPU 18 determines whether the temporary authority enabled of the specified entry is "true" (step S504).

When the temporary authority enabled is "false" (NO in step S504), the CPU 18 notifies the host 2 of an error (step S505) and ends the write command process. That is, the CPU 18 ends the write command process without executing processing for writing data to the nonvolatile memory 6 in accordance with the write command.

When the temporary authority enabled is "true" (YES in step S504), the CPU 18 encrypts the user data to be written with the encryption circuit 15 in which a DEK is set (step S506). The DEK is, for example, the DEK set in step S310 of the user authentication process described with reference to FIG. 11. That is, the DEK is the DEK of the RangeX as the target of the access authority assigned to TmpUserX. The CPU 18 writes the encrypted user data into the nonvolatile memory 6 (step S507). Then, the CPU 18 updates the logical-to-physical address conversion table 132 so as to indicate a correspondence between a physical address in which the encrypted user data has been written and a logical address (step S508), and ends the write command process.

Through the above write command process, in a case where the write command associated with TmpUserX is received and the access authority assigned to TmpUserX is disabled, the CPU 18 can notify the host 2 of the error without executing the write process in accordance with the write command. Therefore, for example, when the user who uses TmpUserX requests write access to the nonvolatile memory 6 after the time limit, the CPU 18 can reject the write access.

Further, in a case where the write command associated with TmpUserX is received and the access authority assigned to TmpUserX is enabled, the CPU 18 can encrypt the user data to be written in accordance with the write command and write the encrypted user data into the nonvolatile memory 6.

Second Embodiment

In the first embodiment, the memory system 3 includes the RTC 17 and the power storage device 5. On the other hand, in a second embodiment, a host 2 includes an RTC and a power storage device.

Configurations of a memory system 3 and the host 2 of the second embodiment are similar to those of the memory system 3 and the host 2 of the first embodiment, and the second embodiment and the first embodiment are different from each other only in terms of the configuration in which the RTC and the power storage device are provided in the host 2. Hereinafter, the difference from the first embodiment will be mainly described.

Figure 14:
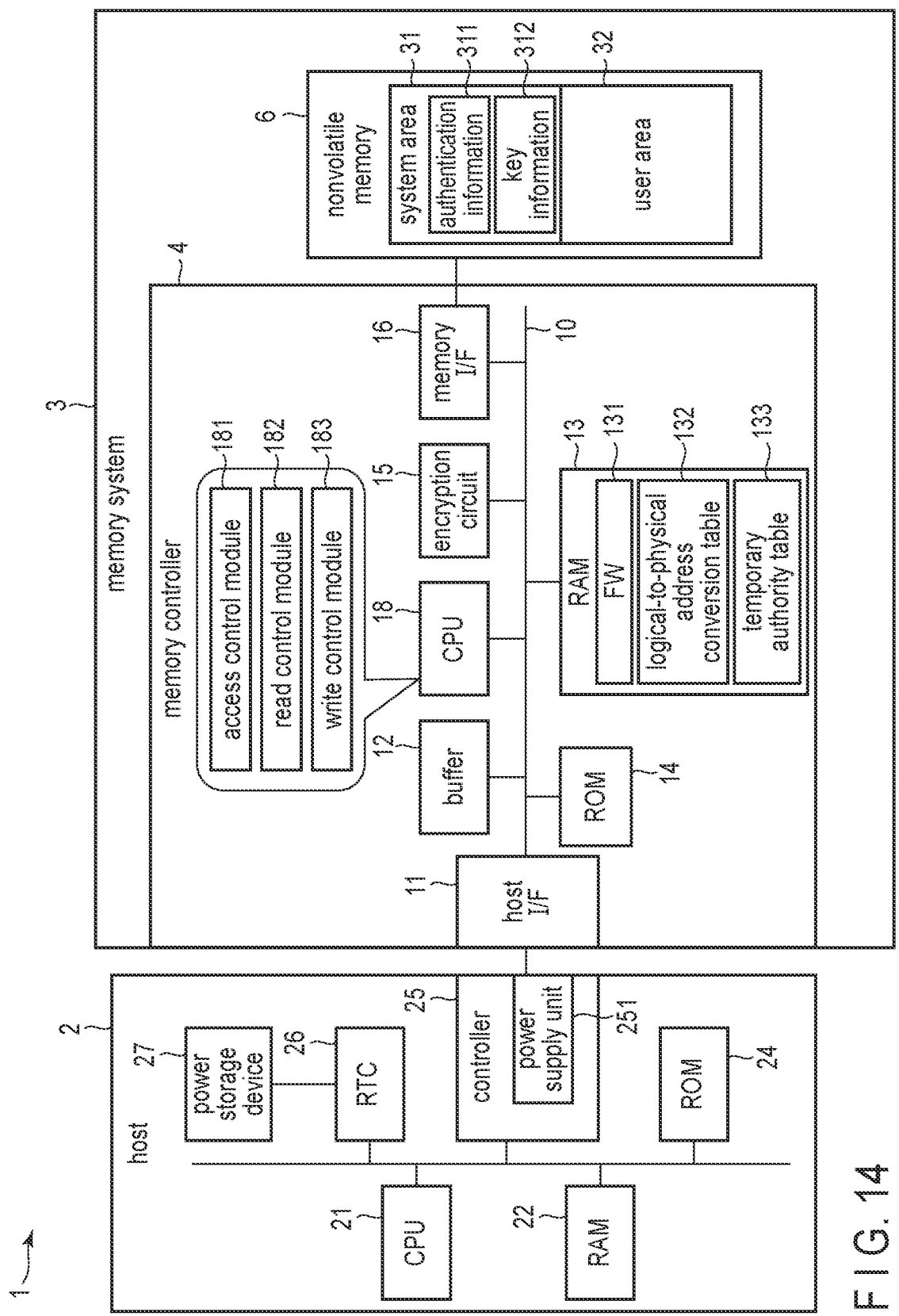
FIG. 14 is a block diagram illustrating a configuration example of an information processing system including a memory system according to a second embodiment.

FIG. 14 illustrates a configuration example of an information processing system 1 that includes the memory system 3 according to the second embodiment. The memory system 3 of the second embodiment does not include the RTC 17 and the power storage device 5 as compared with the memory system 3 of the first embodiment. The host 2 of the second embodiment includes an RTC 26 and a power storage device 27 in addition to the configuration of the host 2 or the first embodiment.

The RTC 26 is a clock that operates regardless of whether power is externally supplied to the host 2. The RTC 26 provides the current time in response to a request from each unit (for example, a CPU 21 and a controller 25) in the host 2. While power is supplied from an external power source to each unit in the host 2, the RTC 26 operates using the supplied power. When power is not supplied from the external power source to each unit in the host 2, the RTC 26 operates using power supplied from the power storage device 27.

The power storage device 27 functions as a power source when the power supplied from the external power source to the host 2 is shut off. Specifically, the power storage device 27 is capable of supplying power to the RTC 26 when the power supplied from the external power source is shut off. The power storage device 27 is realized as a button cell or an electric double-layer capacitor.

When it is necessary to acquire the current time, a CPU 18 (more specifically, an access control module 181) of a memory controller 4 transmits a command for requesting transmission of the current time (hereinafter, referred to as a time request command) to the host 2 via a host I/F 11. The controller 25 (or the CPU 21) of the host 2 acquires the current time from the RTC 26 in accordance with the reception of the time request command from the memory system 3. The controller 25 transmits the acquired current time to the memory system 3. As a result, the CPU 18 of the memory system 3 can acquire the current time.

Note that the memory system 3 of the second embodiment may include the RTC 17 and the power storage device 5 similarly to the memory system 3 of the first embodiment. That is, the RTC 17 and the power storage device 5 may be provided in the memory system 3, and the RTC 26 and the power storage device 27 may be provided in the host 2.

While the internal RTC 17 can provide the accurate current time, the CPU 18 obtains the current time from the RTC 17. Further, for example, when the RTC 17 cannot provide the accurate current time because power supplied from the power storage device 5 is used up, the CPU 18 transmits a time request command to the host 2 to acquire the current time provided by the RTC 26 in the host 2. As a result, the CPU 18 can acquire the current time from either the RTC 17 in the memory system 3 or the RTC 26 in the host 2.

As described above, security for access to a storage can be enhanced according to the first and second embodiments.

The memory controller 4 (more specifically, the access control module 181) of the memory system 3 enables a first access authority to at least partial storage area of a nonvolatile memory 6 that is assigned to first user identification information, and sets a first time limit at which the first access authority becomes disabled. In a case where the current time exceeds the first time limit, the memory controller 4 disables the first access authority.

As a result, the first access authority is disabled when the current time exceeds the first time limit, so that an administrator does not need to perform an operation for issuing a command to disable the first access authority at a timing when the first access authority needs to be disabled. Therefore, it is possible to prevent the access authority that needs to be disabled from remaining in an enabled state due to the mistake in the command operation. Therefore, the risk of data leakage and tampering can be reduced, and security for accessing to the nonvolatile memory 6 can be enhanced.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments nave been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
   a nonvolatile memory; and
   a controller including an access controller configured to:
     control an access to the nonvolatile memory;
     manage one or more ranges obtained by logically dividing a storage area of the nonvolatile memory; and
     manage a temporary authority table and first authentication information that corresponds to a first user ID, the temporary authority table including information on an access authority to access at least one of the one or more ranges,
   the access controller configured to:
     receive, from the host, a first access time limit setting command issued with an administrator authority, the first access time limit setting command requesting enabling a first access authority assigned to the first user ID, requesting setting information on the first access authority in the temporary authority table, and including information that indicates the first user ID, a first range of the ranges, and a first time limit of an access period in which the first access authority to access the first range is enabled;
     in accordance with the received first access time limit setting command, set, in the temporary authority table, the first user ID, information indicating that access to the first range is enabled, and the first time limit;
     acquire a first current time;

while the first current time does not exceed the first time limit set in the temporary authority table, enable the first access authority; and when the first current time has exceeded the first time limit set in the temporary authority table, disable the first access authority, update the temporary authority table to indicate that the access to the first range is disabled, and change the first authentication information corresponding to the first user ID.

2. The memory system of claim 1, wherein the access controller is further configured to:
receive an access request from the host, the access request being a request for accessing the first range and being associated with the first user ID;
in a case where the first access authority is enabled, execute a process related to access to the first range in accordance with the access request; and
in a case where the first access authority is disabled, notify the host of an error without executing the process related to access to the first range in accordance with the access request.

3. The memory system of claim 2, wherein the access controller is further configured to:
receive a first authentication request from the host, the first authentication request including second authentication information associated with the first user ID;
in a case where the first access authority is enabled, execute an authentication process of the first user ID using the second authentication information; and
in a case where the first access authority is disabled, notify the host of an error without executing the authentication process of the first user ID using the first-second authentication information.

4. The memory system of claim 3, wherein the access controller is further configured to:
in a case where the first access authority is enabled and the executed authentication process is successful, execute the process related to access to the first range in accordance with the access request; and
in a case where the first access authority is enabled and the executed authentication process is not successful, notify the host of an error without executing the process related to access to the first range in accordance with the access request.

5. The memory system of claim 1, wherein the access controller is further configured to
encrypt data to be written into the nonvolatile memory using a first encryption key, and decrypt data read from the nonvolatile memory using the first encryption key, and
the access controller is further configured to:
receive a read request from the host, the read request being a request for reading data from the first range and is being associated with the first user ID;
in a case where the first access authority is enabled, read first data corresponding to the read request from the first range, decrypt the read first data using the first encryption key, and transmit the decrypted first data to the host; and
in a case where the first access authority is disabled, notify the host of an error without reading the first data from the first range.

6. The memory system of claim 5, wherein the access controller is further configured to:
encrypt the first encryption key using a second encryption key to acquire a third encryption key, the second encryption key being associated with the first authentication information corresponding to the first user ID; and
in a case where the first access authority is enabled, acquire the second encryption key using the first authentication information, decrypt the third encryption key using the acquired second encryption key to acquire the first encryption key, and decrypt the read first data using the first encryption key.

7. The memory system of claim 6, wherein the access controller is further configured to
discard the third encryption key without discarding the first encryption key in a case where the first access authority becomes disabled.

8. The memory system of claim 7, wherein the access controller is further configured to:
encrypt the first encryption key using a fourth encryption key to acquire a fifth encryption key, the fourth encryption key being associated with second authentication information that is different from the first authentication information; and
acquire the fourth encryption key using the second authentication information, decrypt the fifth encryption key using the acquired fourth encryption key to acquire the first encryption key, and decrypt the read first data using the first encryption key.

9. The memory system of claim 1, further comprising:
a real-time clock; and
a power storage device capable of supplying power to the real-time clock,
wherein the access controller is further configured to acquire the first current time from the real-time clock.

10. The memory system of claim 1, wherein the access controller is further configured to:
receive a first authentication request from the host, the first authentication request being associated with an ID of an administrator having the administrator authority;
execute an authentication process of the administrator using authentication information that is included in the first authentication request; and
in a case where the executed authentication process of the administrator is successful, set in the temporary authority table, the first user ID, the information indicating that the access to the first range is enabled, and the first time limit, in accordance with the first access time limit setting command.

11. The memory system of claim 1, wherein the access controller is further configured to
encrypt data to be written into the nonvolatile memory using a first encryption key, and decrypt data read from the nonvolatile memory using the first encryption key, and
the access controller is further configured to:
receive a write request from the host, the write request being a request for writing second data into the first range and being associated with the first user ID;
in a case where the first access authority is enabled, encrypt the second data using the first encryption key, and write the encrypted second data into the first range; and
in a case where the first access authority is disabled, notify the host of an error without writing the second data into the first range.

12. The memory system of claim 11, wherein the access controller is further configured to:

encrypt the first encryption key using a second encryption key to acquire a third encryption key, the second encryption key being associated with the first authentication information corresponding to the first user ID; and in a case where the first access authority is enabled, acquire the second encryption key using the first authentication information, decrypt the third encryption key using the acquired second encryption key to acquire the first encryption key, and encrypt the second data using the first encryption key.

13. The memory system of claim 12, wherein
the access controller is further configured to
discard the third encryption key without discarding the first encryption key in a case where the first access authority becomes disabled.

14. The memory system of claim 13, wherein
the access controller is further configured to:
encrypt the first encryption key using a fourth encryption key to acquire a fifth encryption key, the fourth encryption key being associated with second authentication information that is different from the first authentication information; and
acquire the fourth encryption key using the second authentication information, decrypt the fifth encryption key using the acquired fourth encryption key to acquire the first encryption key, and encrypt the second data using the first encryption key.

* * * * *